United States Patent
Wakao et al.

(10) Patent No.: US 6,997,142 B2
(45) Date of Patent: Feb. 14, 2006

(54) INTERNAL COMBUSTION ENGINE AND METHOD OF OPERATING INTERNAL COMBUSTION ENGINE

(75) Inventors: Kazuhiro Wakao, Susono (JP); Kazuhiro Sakurai, Gotenba (JP); Takaaki Itou, Mishima (JP); Hiroki Ichinose, Fujinomiya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 203 days.

(21) Appl. No.: 10/757,447

(22) Filed: Jan. 15, 2004

(65) Prior Publication Data

US 2004/0144337 A1   Jul. 29, 2004

(30) Foreign Application Priority Data

Jan. 28, 2003  (JP)  ............... 2003-018261
Sep. 5, 2003  (JP)  ............... 2003-314368

(51) Int. Cl.
*F02B 43/08* (2006.01)
(52) U.S. Cl. .......................................................... 123/3
(58) Field of Classification Search ............... 123/300, 123/3
See application file for complete search history.

(56) References Cited

U.S. PATENT DOCUMENTS

| 4,131,086 A | 12/1978 | Noguchi et al. |
| 4,143,620 A | 3/1979 | Noguchi et al. |
| 2005/0045118 A1 * | 3/2005 | Wakao et al. ............... 123/3 |
| 2005/0056236 A1 * | 3/2005 | Allston et al. ............ 123/1 A |

FOREIGN PATENT DOCUMENTS

| JP | A 4-58064 | 2/1992 |
| JP | A 9-21362 | 1/1997 |
| JP | A 11-92102 | 4/1999 |
| JP | A 11-130405 | 5/1999 |
| JP | A 2000-281307 | 10/2000 |
| JP | A 2000-323164 | 11/2000 |
| JP | A 2001-241365 | 9/2001 |
| JP | 2002-038981 | 2/2002 |
| JP | A 2002-154807 | 5/2002 |
| JP | A 2002-179405 | 6/2002 |

OTHER PUBLICATIONS

Kirwan et al., "Advanced Engine Management Using On-Board Gasoline Partial Oxidation Reforming for Meeting Super-ULEV (SULEV) Emissions Standards," Society of Automotive Engineers, Inc., pp. 1-14, 1999.
Kirwan et al., "Fast Start-Up On-Board Gasoline Reformer for Near Zero Emissions in Spark-Ignition Engines," Society of Automotive Engineers, Inc., pp. 1-12, 2002.
Quader et al., "Engine Performance and Emissions near the Dilute Limit with Hydrogen Enrichment using an On-Board Reforming Strategy," SAE International, pp. 1-10, 2003.

* cited by examiner

*Primary Examiner*—Andrew M. Dolinar
*Assistant Examiner*—Katrina B. Harris
(74) *Attorney, Agent, or Firm*—Oliff & Berridge PLC

(57) ABSTRACT

An internal combustion engine in accordance with one aspect of the invention is characterized by comprising a combustion chamber, a reformer, and a control portion. A predetermined fuel component is burnt in the combustion chamber. The reformer has a reforming catalyst, and that produces a reformed gas which contains the fuel component obtained by reforming a mixture of fuel and air and which supplied to the combustion chamber. The control portion sets an air-fuel ratio of the mixture in the reformer such that a reforming efficiency of the reformer is held within a predetermined range, and sets an amount of the mixture supplied to the reformer such that an actual output torque of the internal combustion engine coincides with a target torque.

20 Claims, 23 Drawing Sheets

INTERNAL COMBUSTION ENGINE AND METHOD OF OPERATING INTERNAL COMBUSTION ENGINE

INCORPORATION BY REFERENCE

The disclosure of Japanese Patent Applications No. 2003-018261 filed on Jan. 28, 2003 and No. 2003-314368 filed on Sep. 5, 2003 including the specifications, drawings and abstracts are incorporated herein by reference in therein entirety.

BACKGROUND OF THE INVENTION

1. Field of the Invention

The invention relates to an internal combustion engine and a method of operating an internal combustion engine.

2. Description of the Related Art

There has been known an internal combustion engine that is provided with a reformer including a reforming catalyst and that causes fuel components obtained by reforming various fuels by means of the reformer to burn in combustion chambers with a view to stabilizing combustion and reducing the amounts of HC and NOx contained in exhaust gas (Japanese Patent Application Laid-Open No. 2001-241365).

One known reformer for reforming a hydrocarbon fuel such as methanol or the like is designed to produce an intermediate product such as aldehyde or the like in a catalyst on the upstream side with respect to a flow direction of fuel and to produce hydrogen from aldehyde or the like in a catalyst on the downstream side with respect to the flow direction with a view to increasing the content of hydrogen in reformed gas (Japanese Patent Application Laid-Open No. 2000-281307). Furthermore, another known reformer is provided with a heater for heating up a reforming catalyst during a starting process of the reformer so as to produce a reformed gas that is rich in hydrogen within a short period of time (Japanese Patent Application No. 11-130405). There is also known an art wherein the air-fuel ratio in a reformer is set approximately equal to 5 as soon as the temperature of a catalyst reaches a predetermined temperature (600° C.) so as to enhance the yield of a fuel component (H2) in reformed gas (Japanese Patent Application No. 9-21362).

On the other hand, when reforming hydrocarbon fuel, suitable management of the temperature of a reforming catalyst (i.e., the temperature of a catalyst bed) is important in preventing the reforming performance from being adversely affected due to a deterioration of a catalyst, suppressing generation of by-products, and reducing the influence of heat on a region around a reformer. As a method of controlling the temperature of a reforming catalyst, there is known an art for suitably setting the temperature of the reforming catalyst by controlling the air-fuel ratio in a reformer using a correlation between the air-fuel ratio of a mixture of air and fuel supplied to the reformer and the temperature reached by the reformer (Japanese Patent Application No. 2002-179405). Documents related to this kind of art include Japanese Patent Application Laid-Open No. 4-58064, Japanese Patent Application Laid-Open No. 2002-154807, Japanese Patent Application Laid-Open No. 2000-323164, and Japanese Patent Application Laid-Open No. 11-92102.

Heretofore, as described above, the importance of suitable management of the temperature of a reforming catalyst has been accentuated in a reformer for reforming fuel. However, when an internal combustion engine equipped with a reformer is viewed as a whole, suitable management of the temperature of the reformer alone does not make it easy to produce a reformed gas for causing the internal combustion engine to operate in conformity with a required condition.

SUMMARY OF THE INVENTION

It is thus an object of the invention to supply a desired reformed gas from a reformer to combustion chambers and to thereby cause an internal combustion engine to operate precisely in conformity with a required condition.

An internal combustion engine in accordance with one aspect of the invention is characterized by comprising a combustion chamber, a reformer, and a control portion. A predetermined fuel component is burnt in the combustion chamber. The reformer has a reforming catalyst, and that produces a reformed gas which contains the fuel component obtained by reforming a mixture of fuel and air and which supplied to the combustion chamber. The control portion sets an air-fuel ratio of the mixture in the reformer such that a reforming efficiency of the reformer is held within a predetermined range, and sets an amount of the mixture supplied to the reformer such that an actual torque of the internal combustion engine coincides with a target torque.

This internal combustion engine is provided with the reformer that reforms the mixture of air and a fuel such as hydrocarbon fuel or the like and that produces a reformed gas containing fuel components such as CO, H2 and the like, and generates power by causing the fuel components contained in the reformed gas flowing from the reformer to burn in the combustion chamber. In developing the internal combustion engine as described above, the inventors first focused attention on the fact that the reforming efficiency of the reformer is correlated with the air-fuel ratio of fuel and air in the reformer.

That is, the reforming efficiency of the reformer changes in accordance with the air-fuel ratio of the mixture in the reformer. However, if the air-fuel ratio of the mixture in the reformer is held within a predetermined range, the reforming efficiency of the reformer is also held within a predetermined period. In view of this, according to this internal combustion engine, the control portion sets the air-fuel ratio of the mixture in the reformer within a predetermined range (preferably as a constant value) such that the reforming efficiency of the reformer is held within a desired range, and sets the amount of the mixture supplied to the reformer such that an actual output torque of the internal combustion engine coincides with a target torque. Thereby, the ratio among the fuel components contained in the reformed gas produced by the reformer can be grasped accurately. This construction makes it possible to supply a desired reformed gas from the reformer to the combustion chamber, and to thereby cause the internal combustion engine to operate precisely in conformity with a required condition.

In this case, it is preferable that the reformer produce a reformed gas containing CO and H2 by reforming a mixture of hydrocarbon fuel and air, and that the control portion set a ratio O/C of a number of oxygen atoms in air to a number of carbon atoms in fuel supplied to the reformer approximately within a range of 0.4 to 1.1. It is more preferable that the control portion set a ratio O/C of a number of oxygen atoms in air to a number of carbon atoms in fuel supplied to the reformer approximately within a range of 0.8 to 1.05. This construction makes it possible to hold the reforming efficiency of the reformer within a practically desirable range.

In addition, it is preferable that the control portion set an amount of air supplied to the reformer such that an actual output torque of the internal combustion engine coincides with a target torque, and set an amount of fuel supplied to the reformer on the basis of the amount of air and the air-fuel ratio.

This construction makes it possible to hold the reforming efficiency of the reformer within a desired range, and to cause the internal combustion engine to generate a desired torque.

Further, it is preferable that the internal combustion engine of the aforementioned aspect further comprise an air-supply passage for mixing air with the reformed gas produced by the reformer and an adjustment portion that is provided in the air-supply passage and that is designed to adjust an amount of air mixed with the reformed gas via the air-supply passage, and that the control portion control the adjustment portion such that an air-fuel ratio of the mixture absorbed into the combustion chamber becomes equal to a desired value.

This construction makes it possible to set the air-fuel ratio of the mixture in the combustion chamber as a desired value while holding the reforming efficiency of the reformer within a desired range.

It is preferable that the control portion substantially simultaneously set amounts of air and fuel supplied to the reformer and an amount of air mixed with the reformed gas in accordance with the target torque.

In addition, it is preferable that the internal combustion engine of the aforementioned aspect further comprise a temperature detection portion that detects a temperature of the reforming catalyst, and that the control portion estimate the air-fuel ratio of the mixture in the reformer on the basis of the temperature detected by the temperature detection portion.

That is, since the temperature of the reforming catalyst (the temperature of the catalyst bed) is correlated with the air-fuel ratio of the mixture in the reformer, this construction makes it possible to estimate the air-fuel ratio of the mixture in the reformer from the temperature of the reforming catalyst.

It is preferable that the control portion be capable of correcting the estimated air-fuel ratio in the reformer in accordance with an amount of fuel supplied to the reformer.

As described above, the temperature of the reforming catalyst is correlated with the air-fuel ratio of the mixture in the reformer. However, even if the air-fuel ratio of the mixture in the reformer is constant, the temperature of the reforming catalyst rises in accordance with an increase in amount of fuel supplied to the reformer. Accordingly, if the estimated air-fuel ratio in the reformer is corrected on the basis of an amount of fuel supplied to the reformer as in the case of this construction, an air-fuel ratio of the mixture in the reformer can be calculated with high precision.

It is also appropriate that the control portion adjust an amount of fuel supplied to the reformer on the basis of the estimated air-fuel ratio.

Furthermore, it is also appropriate that the internal combustion engine of the aforementioned aspect comprise a temperature detection portion that detects a temperature of the reforming catalyst, and that the control portion adjust an amount of fuel supplied to the reformer on the basis of the temperature detected by the temperature detection portion.

In addition, it is preferable that the control portion set the air-fuel ratio of the mixture of fuel and air in the reformer larger than the air-fuel ratio corresponding to the reforming efficiency within the predetermined range when the supply of the mixture to the reformer is started.

In general, when the supply of the mixture of fuel and air to the reformer is started, the reforming catalyst is often not activated sufficiently. In view of this, this construction is designed to set the air-fuel ratio of the mixture in the reformer larger than the air-fuel ratio corresponding to the reforming efficiency within the aforementioned predetermined range, for example, for a predetermined period since the supply of the mixture of fuel and air to the reformer is started. This makes it possible to promote ignition of fuel in the reforming catalyst, and to raise the temperature of the catalyst to an activation temperature within a short period.

In addition, it is also appropriate that an air supply amount be reduced before stoppage of the supply of fuel to the reformer when the supply of the mixture to the reformer is stopped.

As described above, when the supply of the mixture to the reformer is stopped, the amount of oxygen in the reformer becomes temporarily excessive, whereby the temperature of the reforming catalyst may rise abruptly. In this case, however, the amount of air to be supplied may be reduced prior to the stoppage of the supply of fuel to the reformer as in the case of this construction. This makes it possible to prevent the amount of oxygen in the reformer from becoming excessive, to suppress the progress of a reaction in the reformer, and to cool the reforming catalyst (the reformer). Accordingly, this construction also makes it possible to reliably inhibit the reforming catalyst from deteriorating due to an abrupt rise in temperature.

It is preferable that the internal combustion engine in accordance with the invention further comprise an exhaust gas recirculation portion that causes exhaust gas flowing from the combustion chamber to recirculate to the reformer.

In the internal combustion engine in accordance with the invention, the air-fuel ratio of the mixture in the reformer is set such that the reforming efficiency of the reformer is held within a desired range. In this case, however, since fuel and air may not be sufficiently mixed with each other in the reformer, the reforming reaction may not occur at the reforming efficiency within the aforementioned desired range, or the temperature of the catalyst may rise excessively. On the other hand, if the internal combustion engine is provided with the exhaust gas recirculation portion that causes exhaust gas flowing from the combustion chamber to recirculate to the reformer, fuel and air can be suitably mixed with each other in the reformer through recirculation of exhaust gas from the combustion chamber to the reformer.

In addition, it is preferable that the internal combustion engine in accordance with the invention further comprise a temperature detection portion that detects a temperature of the reforming catalyst and a control portion that controls the exhaust gas recirculation portion on the basis of the temperature detected by the temperature detection portion.

In the internal combustion engine in accordance with the invention, the air-fuel ratio of the mixture in the reformer is set such that the reforming efficiency of the reformer is held within a predetermined range. However, because the temperature of the reforming catalyst abruptly changes in accordance with a change in load or the like, the reforming efficiency within the aforementioned desired range may not be obtained due to an abrupt change in temperature of the reforming catalyst. On the other hand, as in the case of this construction, by constantly monitoring the temperature of the reforming catalyst by means of the temperature detection portion and causing exhaust gas to recirculate from the combustion chamber to the reformer by means of the exhaust gas recirculation portion or increasing an amount of exhaust gas recirculated by the exhaust gas recirculation portion in response to an abrupt change (an abrupt rise) in temperature in the reformer, it becomes possible to inhibit the temperature of the reforming catalyst from changing abruptly and to always hold the reforming efficiency of the reformer within a desired range.

It is preferable that the exhaust gas recirculation portion increase an amount of exhaust gas recirculated to the reformer when the supply of the mixture to the reformer is stopped.

When the supply of the mixture to the reformer is stopped to stop the reforming reaction in the reformer, the amount of oxygen in the reformer may temporarily become excessive. In this case, the reforming catalyst may deteriorate due to an abrupt rise in the temperature thereof. On the other hand, if the amount of exhaust gas recirculated to the reformer by the exhaust gas recirculation portion is increased in stopping supplying the mixture to the reformer, the amount of oxygen in the reformer can be prevented from becoming excessive, and the reforming catalyst (the reformer) can be cooled. Accordingly, this construction makes it possible to reliably inhibit the reforming catalyst from deteriorating due to an abrupt rise in temperature.

Further, it is preferable that the reformer have a plurality of reforming reaction portions disposed along a flow direction of the mixture and an oxygen supply portion that supplies oxygen to an oxygen inflow portion set between the reforming reaction portions, and that the air-fuel ratio of the mixture be set smaller than an air-fuel ratio corresponding to the reforming efficiency within the predetermined range in the reforming reaction portion that is disposed upstream of the oxygen inflow portion with respect to the flow direction.

In general, since the reforming reaction progresses within an extremely short period, the temperature in the reformer tends to be high on the upstream side with respect to the flow direction of the mixture. The stronger this tendency becomes, the more the reforming catalyst on the upstream side with respect to the flow direction deteriorates. If air and fuel have not been sufficiently mixed with each other upstream of the reformer (the reforming catalyst), the reforming catalyst is heated up in a range corresponding to an excessive amount of oxygen. As a result, the reforming reaction does not sufficiently progress in a range corresponding to an excessive amount of fuel, so that unreformed fuel may be mixed directly into the reformed gas.

On the other hand, according to this construction, the air-fuel ratio of the mixture is set smaller than an air-fuel ratio corresponding to a reforming efficiency within the aforementioned predetermined range (the amount of fuel is made excessive) in the reforming reaction portion located upstream of the oxygen inflow portion with respect to the flow direction of the mixture. Therefore, the reforming catalyst in the reforming reaction portion upstream of the oxygen inflow portion can be inhibited from being excessively heated up. Fuel is gasified in the reforming reaction portion upstream of the oxygen inflow portion, then mixes with oxygen in the oxygen inflow portion, and is excellently reformed in the reforming reaction portion downstream of the oxygen inflow portion. Accordingly, adoption of this construction makes it possible to inhibit the reforming catalyst from locally deteriorating, to reliably reform fuel, and to suitably hold the reforming efficiency of the reformer within a desired range.

In addition, it is preferable that the oxygen supply portion supply oxygen to the oxygen inflow portion of the reformer, and that an air-fuel ratio of the mixture be set larger than the air-fuel ratio corresponding to the reforming efficiency within the predetermined range in the reforming reaction portion that is disposed upstream of the oxygen inflow portion with respect to the flow direction, upon fulfillment of a predetermined operational condition on the reformer.

As described above, if the air-fuel ratio of the mixture in the reforming reaction portion upstream of the oxygen inflow portion with respect to the flow direction is set as a small value, coking of the reforming catalyst may occur in the reforming reaction portion on the upstream side. On the other hand, even if oxygen is supplied to the oxygen inflow portion of the reformer as in the case of this construction, the occurrence of coking can be suppressed, and the reforming catalyst in which coking has occurred can be regenerated, by setting the air-fuel ratio of the mixture in the reforming reaction portion disposed upstream of the oxygen inflow portion with respect to the flow direction as a large value upon fulfillment of a predetermined operational condition relating to the operating period of the reformer or the temperature of the reforming catalyst.

It is preferable that the reformer have a reforming reaction portion in which the reforming catalyst is disposed, that the reforming reaction portion include a catalyst small-amount-carriage region at least either at an upstream end thereof or at a downstream end thereof with respect to the flow direction of the mixture, an amount of the reforming catalyst in the catalyst small-amount-carriage region being smaller than an amount of the reforming catalyst in any other region.

As in the case of this construction, if at least one of the upstream and downstream ends of the reforming reaction portion is formed as the catalyst small-amount-carriage region, the heat of reaction generated in a region other than the catalyst small-amount-carriage region of the reforming reaction portion is transferred to the catalyst small-amount-carriage region. Accordingly, adoption of this construction makes it possible to improve the heat radiation performance of the reformer as a whole and to effectively inhibit the reforming catalyst from being heated up.

Moreover, if the upstream end of the reformer is formed as the catalyst small-amount-carriage region, the progress of the reforming reaction at the upstream end of the reformer is suppressed. Therefore, an excessive rise in temperature of the reforming catalyst, which generally tends to occur upstream of the reformer, can be suppressed. In this case, the catalyst small-amount-carriage region at the upstream end of the reforming reaction portion receives heat from the downstream region and is suitably heated up. Therefore, fuel supplied to the reformer can be gasified in the catalyst small-amount-carriage region and be suitably mixed with air.

According to another aspect of the invention, there is provided a method of operating an internal combustion engine comprising a combustion chamber in which a predetermined fuel component is burnt and a reformer that has a reforming catalyst, that reforms a mixture of fuel and air, that contains the fuel component, and that produces a reformed gas supplied to the combustion chamber. This method comprises the steps of setting an air-fuel ratio of the mixture in the reformer such that a reforming efficiency of the reformer is held within a predetermined range and setting an amount of the mixture supplied to the reformer such that an actual torque of the internal combustion engine coincides with a target torque.

The method of operation of the aforementioned aspect makes it possible to supply a desired reformed gas from the reformer to the combustion chamber and to cause the internal combustion engine to operate precisely in conformity with a required condition.

DETAILED DESCRIPTION OF THE PREFERRED EMBODIMENTS

Hereinafter, preferred embodiments of an internal combustion engine and a method of operating an internal combustion engine in accordance with the invention will be described in detail with reference to the drawings.

[First Embodiment]

Figure 1:
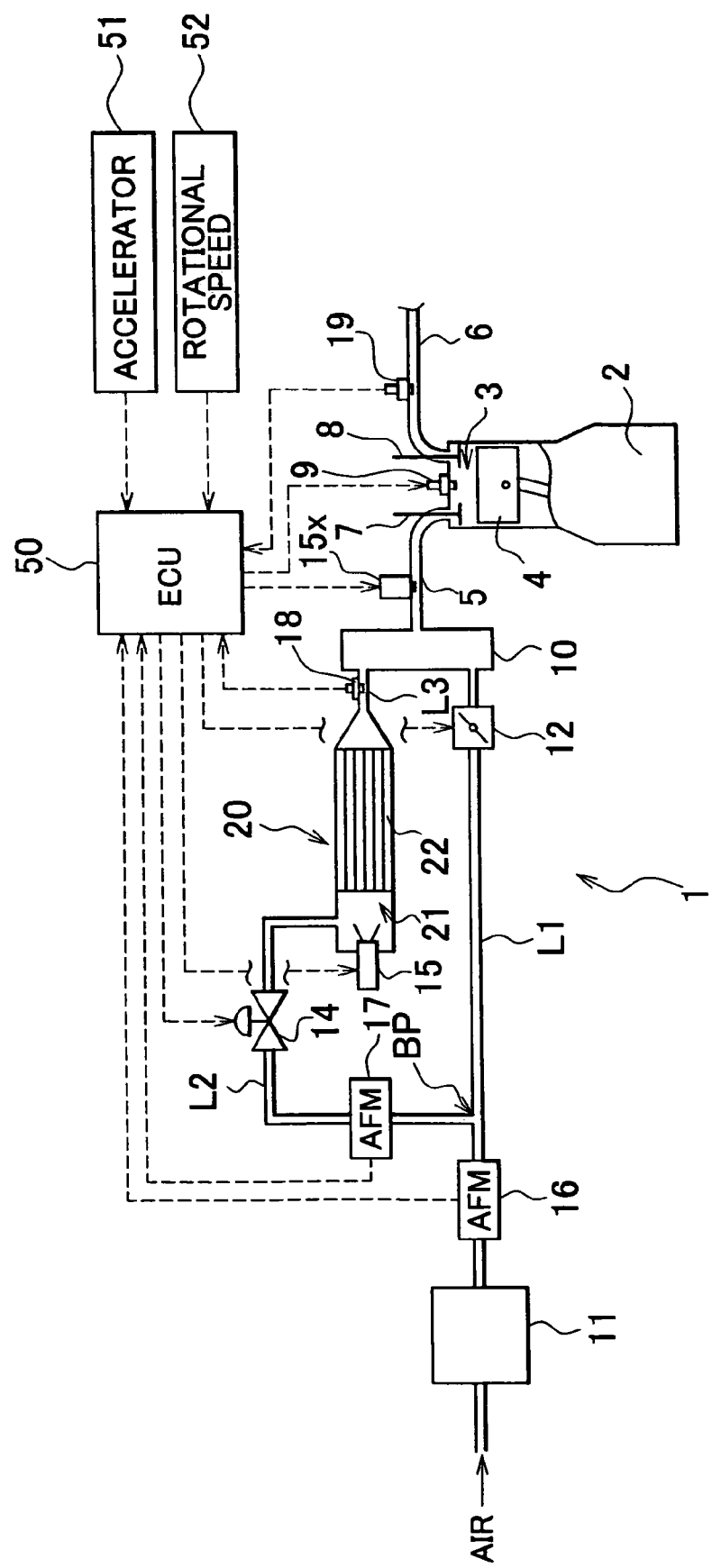
FIG. 1 is a schematic block diagram of an internal combustion engine in accordance with a first embodiment of the invention.

FIG. 1 is a schematic diagram of an internal combustion engine in accordance with the first embodiment of the invention. An internal combustion engine 1 shown in FIG. 1 generates power by burning a mixture containing fuel components in a plurality of combustion chambers 3 formed in an engine block 2 and reciprocating pistons 4 in the combustion chambers 3. An intake pipe 5 and an exhaust pipe 6 are connected to each of the combustion chambers 3. Each intake port is provided with an intake valve 7, while each exhaust port is provided with an exhaust valve 8. The internal combustion engine 1 has an ignition plug 9 for each of the combustion chambers 3.

As shown in FIG. 1, the intake pipe 5 is connected to a surge tank 10 to which an air-supply pipe L1 is connected. The air-supply pipe L1 is connected to an air intake (not shown) via an air cleaner 11. The air-supply pipe L1 extends across an electronic throttle 12 (which is located between the surge tank 10 and the air cleaner 11). A bypass pipe L2 branches off from the air-supply pipe L1 at a bifurcated portion BP set between the air cleaner 11 and the electronic throttle 12. The bypass pipe L2 extends across a flow rate adjusting valve 14 whose leading end (which is not on the side of the bifurcated portion BP) is connected to a reformer 20.

The reformer 20 includes an air-fuel mixing portion 21 to which the bypass pipe L2 is connected, and a reforming reaction portion 22 adjacent to the air-fuel mixing portion 21. In addition to the bypass pipe L2, a fuel injection device 15 for injecting a hydrocarbon fuel such as gasoline or the like is also connected to the air-fuel mixing portion 21. A reforming catalyst which is obtained, for example, by having rhodium carried on zirconia is disposed in the reforming reaction portion 22. An outlet of the reformer 20 is connected to the surge tank 10 via a connecting pipe L3. Thus, the reformer 20 is so disposed as to bypass the air-supply pipe L1.

On the other hand, an air flow meter 16 for detecting a total amount of air introduced from the air intake is installed upstream of the bifurcated portion BP of the air-supply pipe L1 (more specifically, between the bifurcated portion BP and the air cleaner 11). The bypass pipe L2 is equipped with an air flow meter 17 for detecting an amount of air flowing through the bypass pipe L2. The air flow meter 17 is installed between the bifurcated portion BP and the flow rate adjusting valve 14. In addition, the connecting pipe L3 is equipped with a temperature sensor 18 for detecting a temperature in the reformer 20 (i.e., a temperature of the reforming catalyst bed). The exhaust pipe 6 connected to each of the combustion chambers 3 is equipped with an exhaust gas A/F sensor 19 for detecting an air-fuel ratio of exhaust gas flowing through the exhaust pipe 6.

The air flow meters 16 and 17, the temperature sensor 18, and the exhaust gas A/F sensor 19 are connected to an ECU 50. The ECU 50 includes a CPU, a ROM, a RAM, input/output ports to which the aforementioned sensors are connected, a storage unit in which various pieces of information are stored, and the like. A signal indicating a depression stroke is delivered to the ECU 50 from an accelerator 51 (an accelerator position sensor), and a signal indicating an actual rotational speed of the internal combustion engine 1 is delivered to the ECU 50 from a rotational speed sensor 52 (a crank angle sensor). On the basis of values detected by the air flow meters 16 and 17, the temperature sensor 18, the exhaust gas A/F sensor 19 and the like, signals output from the accelerator 51 and the rotational speed sensor 52, and the like, the ECU 50 controls openings of the electronic throttle 12 and the flow rate adjusting valve 14, an amount of fuel injected from the fuel injection device 15, a timing for igniting the ignition plug 9, and the like.

In operating the internal combustion engine 1 thus constructed, air is introduced into the air-fuel mixing portion 21 of the reformer 20 via the flow rate adjusting valve 14 of the bypass pipe L2, and a fuel such as gasoline or the like is injected from the fuel injection device 15 controlled by the ECU 50. The ECU 50 adjusts an opening of the flow rate adjusting valve 14. The fuel such as gasoline or the like is gasified in the air-fuel mixing portion 21, mixes with air flowing from the bypass pipe L2, and flows into the reforming reaction portion 22. In the reforming reaction portion 22, the reforming catalyst causes hydrocarbon fuel to react with air, and a partial oxidation reaction expressed by a formula (1) shown below progresses, whereby a reformed gas containing CO and H2 is produced. The reformed gas thus produced is introduced into the surge tank 10 from the outlet of the reformer 20 via the connecting pipe L3.

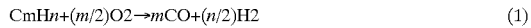
$$C_mH_n + (m/2)O_2 \rightarrow mCO + (n/2)H_2 \quad (1)$$

Air is introduced into the surge tank 10 via the electronic throttle 12 of the air-supply pipe L1. The ECU 50 adjusts an opening of the electronic throttle 12. Accordingly, the reformed gas introduced into the surge tank 10 from the reformer 20 is further mixed with air in the surge tank 10 and then is absorbed into the combustion chambers 3. If the ignition plug 9 is ignited at a predetermined timing, CO and H2 as fuel components burn in the combustion chambers 3, and the pistons 4 reciprocate, whereby power can be obtained from the internal combustion engine 1. In the internal combustion engine 1, power can also be obtained by stopping supplying the reformer 20 with air and fuel and causing a fuel injection device 15x attached to the intake pipe 5 to inject fuel.

In the internal combustion engine 1 mentioned above, for example, in view of a correlation between a reforming efficiency of the reformer 20 and an air-fuel ratio of the mixture in the reformer 20, the ECU 50 sets the air-fuel ratio of the mixture of fuel and air in the reformer 20 as a substantially constant value such that the reforming efficiency of the reformer 20 is held within a desired range that is good for practical purposes. In the internal combustion engine 1, therefore, the ratio between the fuel components CO and H2 in the reformed gas produced by the reformer 20 is always grasped accurately. Thereby, the internal combustion engine 1 can be so operated as to precisely comply with a required condition by supplying a desired reformed gas from the reformer 20 to the combustion chambers 3.

Figure 2:
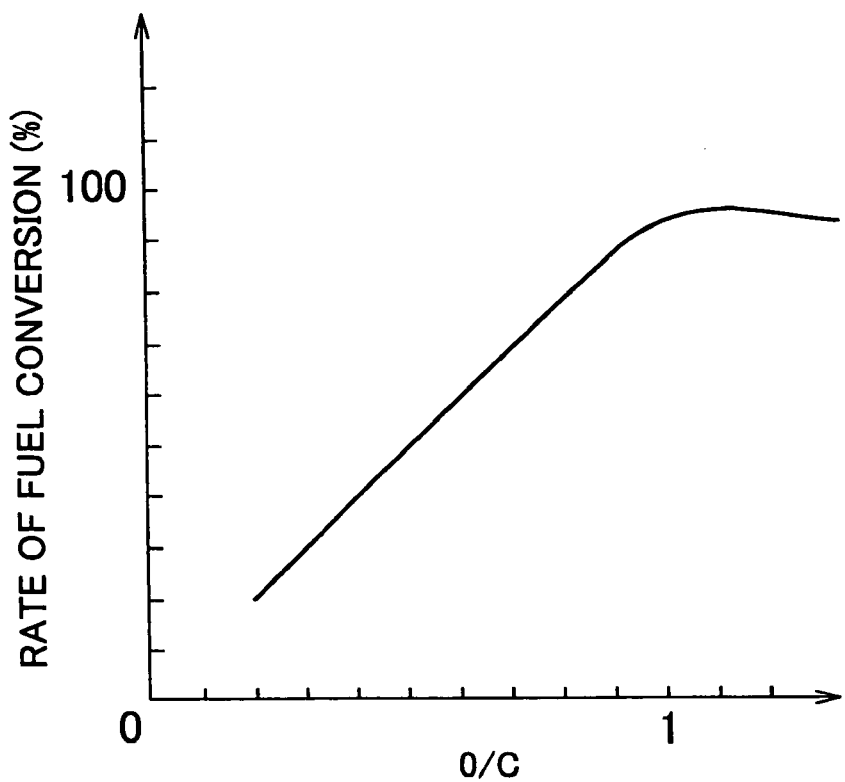
FIG. 2 is a graph showing a relationship between the air-fuel ratio of a mixture in a reformer and the rate of fuel conversion in the reformer.

The air-fuel ratio of the mixture in the reformer 20 and the reforming efficiency of the reformer 20 are correlated with each other as shown in FIG. 2. FIG. 2 is a graph showing a relationship between the ratio O/C of the number of oxygen atoms in air to the number of carbon atoms in fuel supplied to the reformer 20 and the rate of fuel conversion in the reformer 20. In this case, the ratio O/C is substantially equivalent to the air-fuel ratio of the mixture supplied to the reformer 20. The rate of fuel conversion is a parameter for evaluating the reforming efficiency. As is apparent from FIG. 2, the rate of fuel conversion in the reformer 20 changes in accordance with the ratio O/C of the mixture in the reformer 20. The rate of fuel conversion increases substantially in proportion to the ratio O/C until the ratio O/C reaches 1. However, once the ratio O/C exceeds 1, there is no recognizable increase in the rate of fuel conversion in the reformer 20.

In this case, from a practical point of view, the reforming efficiency of the reformer 20, namely, the rate of fuel conversion in the reformer 20 needs to be held equal to at least about 40%. This is because of the following reason. As is apparent from a correlation (FIG. 3) between the ratio O/C of the mixture in the reformer 20 and the concentration of H2 contained in the reformed gas obtained from the reformer 20, the rate of fuel conversion is approximately 40% when the ratio O/C is approximately 0.4, and the concentration of H2 contained in the reformed gas obtained from the reformer 20 drastically decreases if the ratio O/C drops below 0.4. Moreover, as is apparent from a correlation (FIG. 4) between the ratio O/C of the mixture in the reformer 20 and the temperature of the catalyst bed in the reformer 20, the temperature of the catalyst bed drops below 700° C. if the ratio O/C drops below 0.4, so that the possibility of coking in the reforming catalyst is enhanced.

Figure 3:
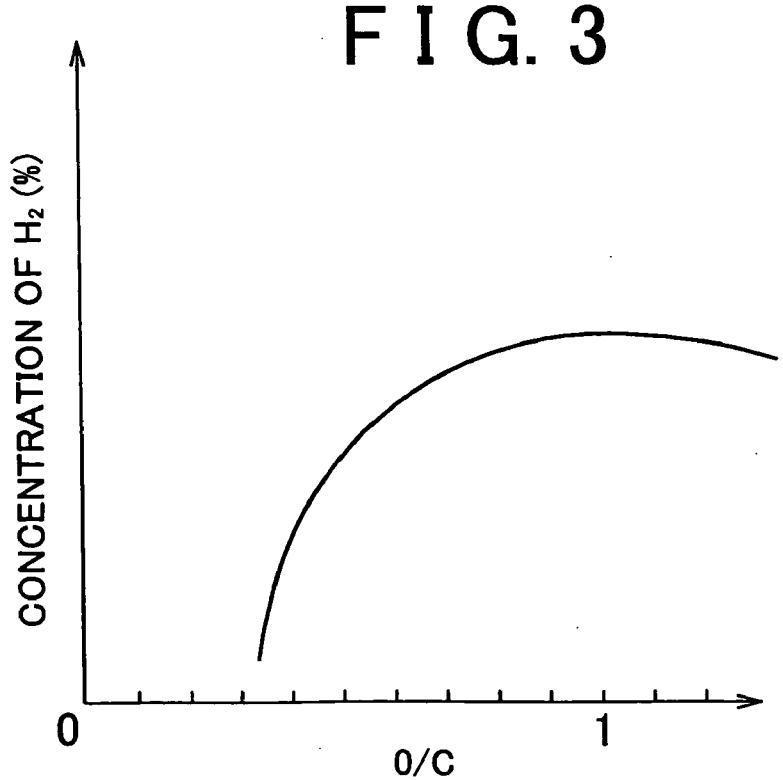
FIG. 3 is a graph showing a relationship between a ratio O/C of the number of oxygen atoms in air to the number of carbon atoms in fuel supplied to the reformer and the concentration of H2 in a reformed gas obtained from the reformer.
Figure 4:
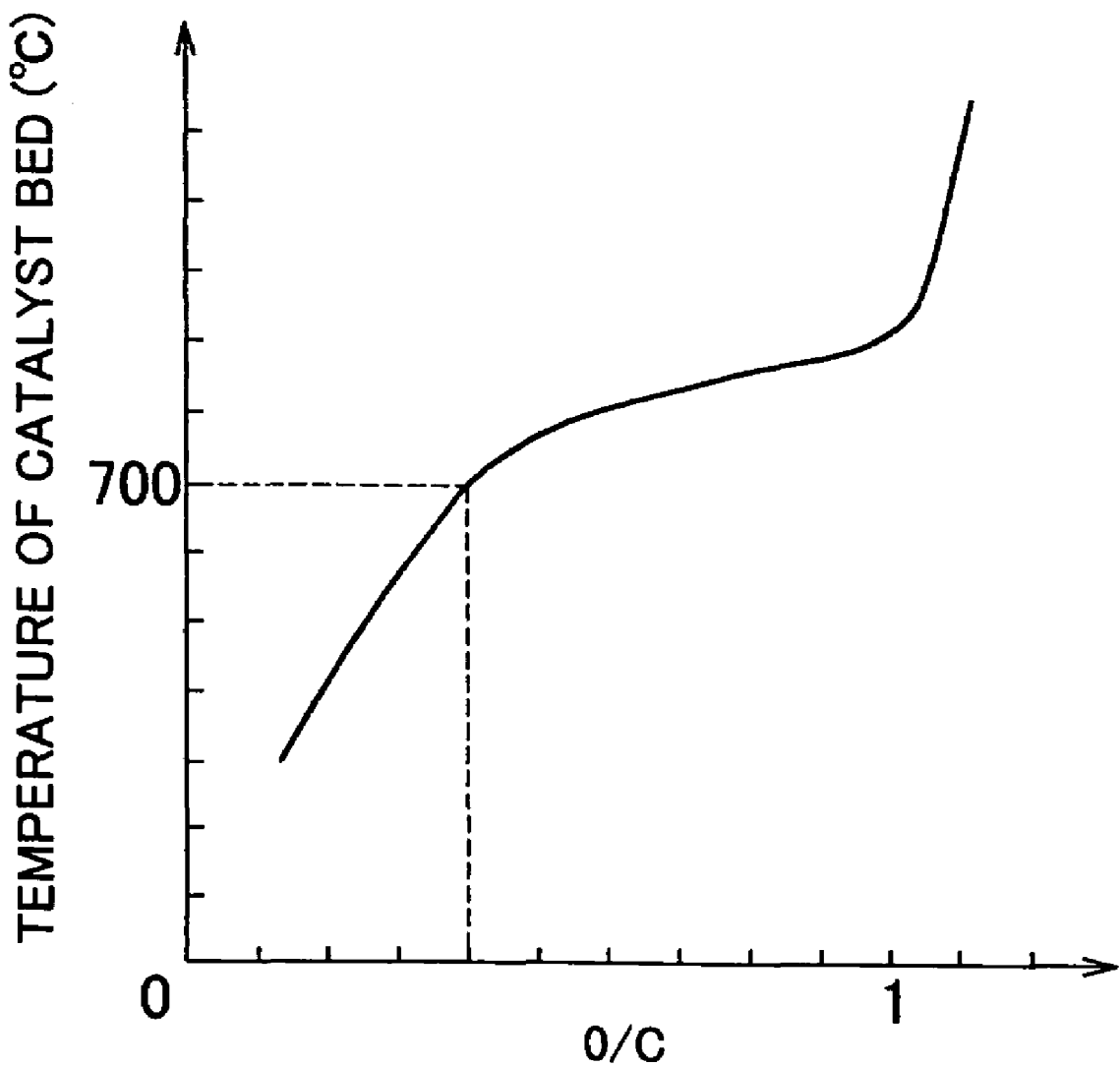
FIG. 4 is a graph showing a relationship between the ratio O/C of the number of oxygen atoms in air to the number of carbon atoms in fuel supplied to the reformer and the temperature of a catalyst bed in the reformer.

As is apparent from FIG. 3, if the ratio O/C is about 0.8, the concentration of H2 obtained from the reformer 20 is substantially comparable with a peak concentration. Accordingly, it is more preferable from a practical point of view that the reforming efficiency of the reformer 20, namely, the rate of fuel conversion in the reformer 20 be set as about 80% or more of a value in the case where the ratio O/C is about 0.8.

On the other hand, as is apparent from FIG. 2, if the ratio O/C exceeds 1, there is no recognizable increase in the rate of fuel conversion in the reformer 20, and the concentration of H2 decreases correspondingly. As is apparent from FIG. 4, the temperature of the catalyst bed starts rising if the ratio O/C exceeds more or less 1.05, and the temperature of the catalyst bed abruptly rises once the ratio O/C exceeds 1.1. Accordingly, the upper limit of the ratio O/C for maintaining practically good reforming efficiency in the reformer 20 can be set as about 1.1, more preferably, about 1.05.

In consideration of the foregoing, in the internal combustion engine 1, the ratio O/C of the number of oxygen atoms to the number of carbon atoms in fuel supplied to the reformer 20 is always set as a constant value (O/C=1 in the first embodiment) that is approximately within a range of 0.4 to 1.1, more preferably, within a range of 0.8 to 1.05. Thereby, the rate of fuel conversion in the reformer 20 can be made substantially constant approximately within a range of 40% to 100%, more preferably, within a range of 80% to 100%.

More specifically, the ECU 50 first sets a target torque of the internal combustion engine 1 (a predetermined target rotational speed during idling) corresponding to an accelerator depression stroke indicated by a signal output from the accelerator 51. In addition, the ECU 50 sets an amount of air to be supplied to the reformer 20 (i.e., a reformed air supply amount) and an amount of fuel injected from the fuel injection device 15, namely, an amount of the mixture supplied to the reformer 20, such that the ratio O/C of the mixture in the reformer 20 becomes constant (O/C=1) and that an actual output torque (rotational speed) coincides with the target torque (target rotational speed). At the same time, the ECU 50 sets an amount of air to be supplied into the surge tank 10 from the electronic throttle 12 (i.e., an amount of air to be mixed) so as to equalize an air-fuel ratio of the mixture absorbed into the combustion chambers 3 with a desired value.

The ECU 50 then adjusts an opening of the flow rate adjusting valve 14 such that a value detected by the air flow meter 17 for the bypass pipe L2 coincides with the reformed air supply amount determined previously, and causes the fuel injection device 15 to inject the previously determined amount of fuel. The ECU 50 also adjusts an opening of the electronic throttle 12 such that a difference between a value detected by the air flow meter 16 for the air-supply pipe L1 and the value detected by the air flow meter 17 for the bypass pipe L2 coincides with the previously determined amount of air to be mixed. Thereby, the reforming efficiency of the reformer 20 is held within a desired range, and the air-fuel ratio of the mixture in the combustion chambers 3 is set as a desired value. As a result, a desired torque can be generated by the internal combustion engine 1.

Figure 5:
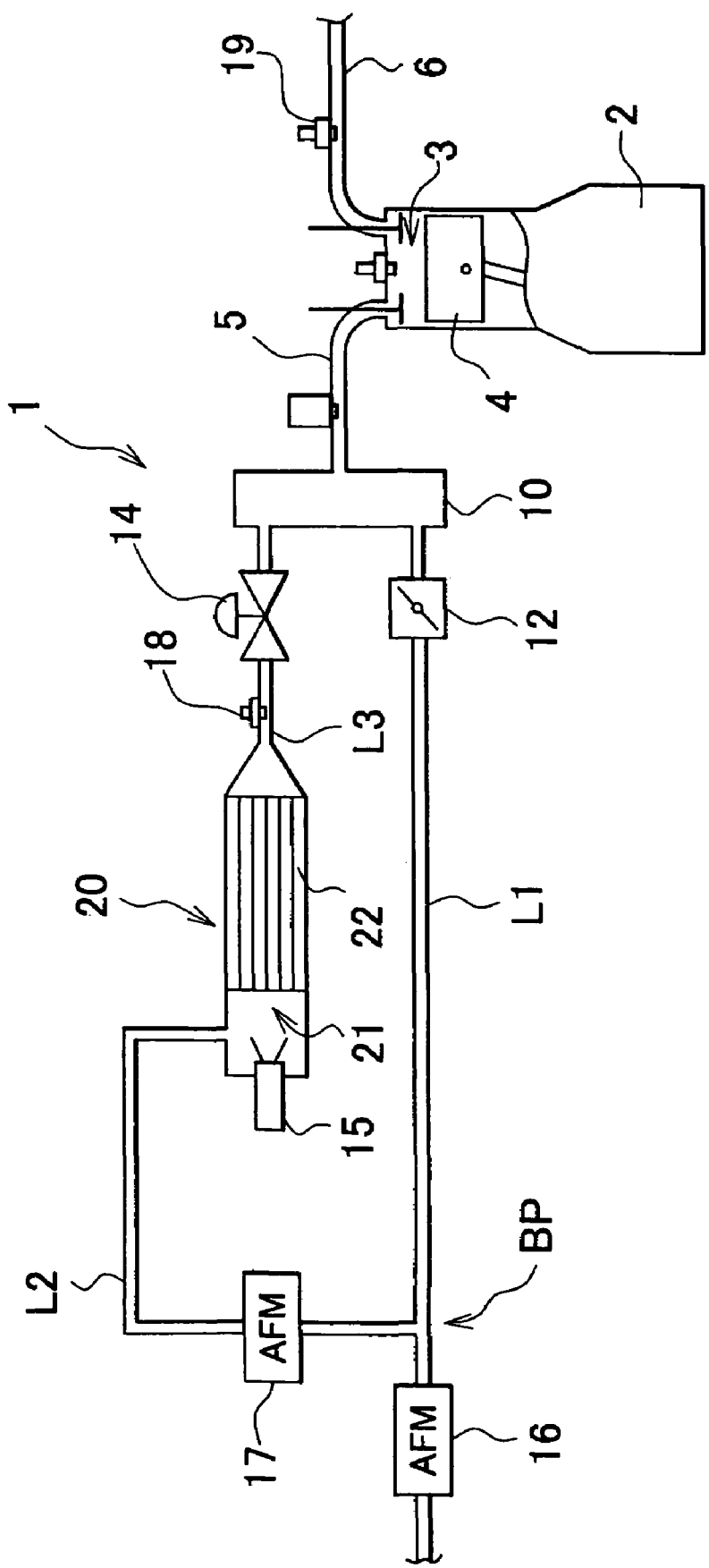
FIG. 5 is a schematic block diagram of an internal combustion engine in accordance with a modification example of the first embodiment of the invention.

In the internal combustion engine 1 mentioned above, it is not absolutely required that the flow rate adjusting valve 14 be disposed upstream of the reformer 20 (between the bifurcated portion BP and the reformer 20). That is, as shown in FIG. 5, the flow rate adjusting valve 14 may be disposed downstream of the reformer 20. In other words, the connecting pipe L3 connecting the reformer 20 to the surge tank 10 may be provided with the flow rate adjusting valve 14. Adoption of this construction also makes it possible to supply the mixture of air and fuel to the reformer 20 with high precision. In this construction, by closing the flow rate adjusting valve 14, unreformed HC that have increased in amount in the reforming reaction portion 22 can be prevented from being absorbed into the combustion chambers 3 when the reformer 20 is stopped during operation of the internal combustion engine 1.

Figure 6:
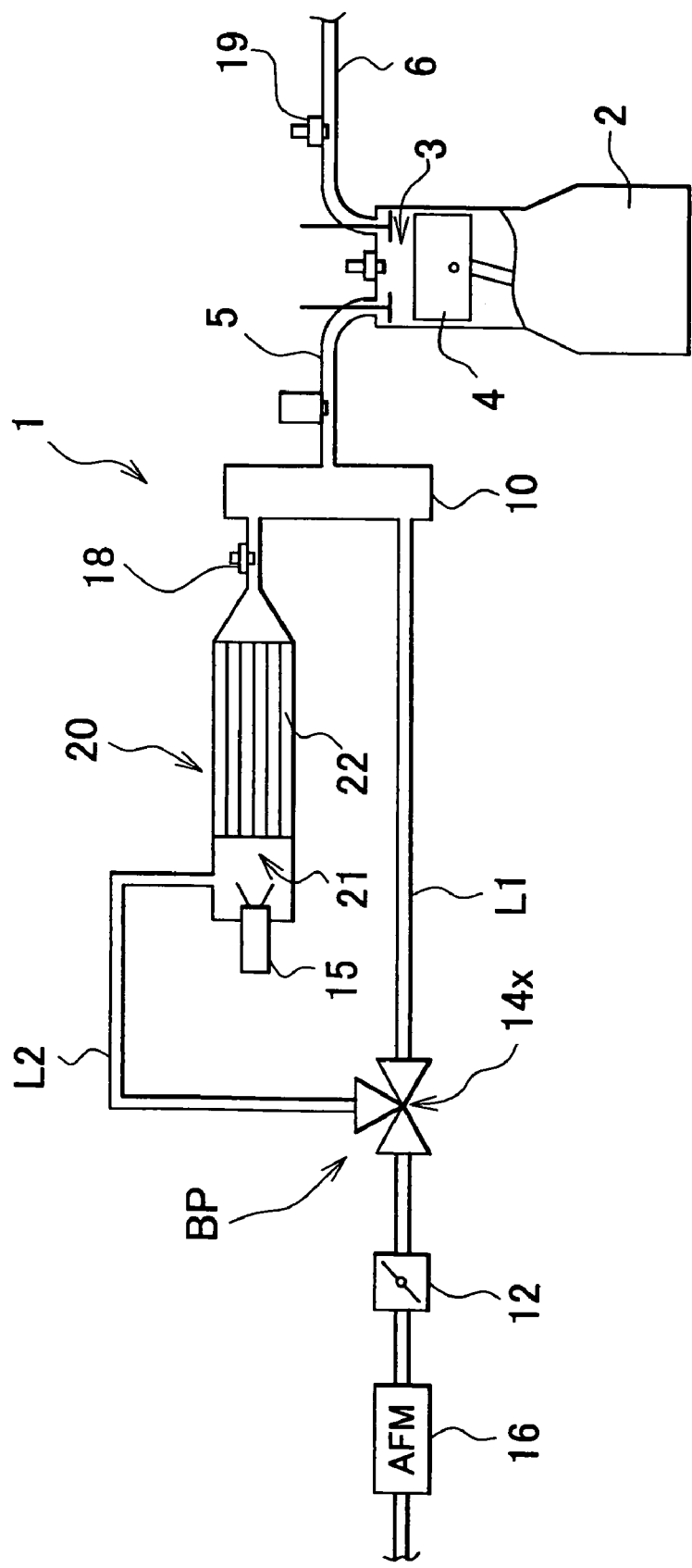
FIG. 6 is a schematic block diagram of an internal combustion engine in accordance with another modification example of the first embodiment of the invention.

Moreover, in the internal combustion engine 1 mentioned above, the bifurcated portion BP as a junction between the air-supply pipe L1 and the bypass pipe L2 may be provided with a three-way flow rate adjusting valve 14x as shown in FIG. 6. In this case, the electronic throttle 12 is disposed upstream of the three-way flow rate adjusting valve 14x and downstream of the air flow meter 16, and the air flow meter for the bypass pipe L2 is dispensable. An amount of reformed air supplied to the reformer 20 from the bifurcated portion BP through the three-way flow rate adjusting valve 14 and an amount of air to be mixed into the surge tank 10 from the bifurcated portion BP through the three-way flow rate adjusting valve 14 are individually set by the ECU. This construction makes it possible to set an amount of air eventually supplied into the combustion chambers 3 only by the electronic throttle 12. Therefore, the controllability of the entire engine can be enhanced.

Figure 7:
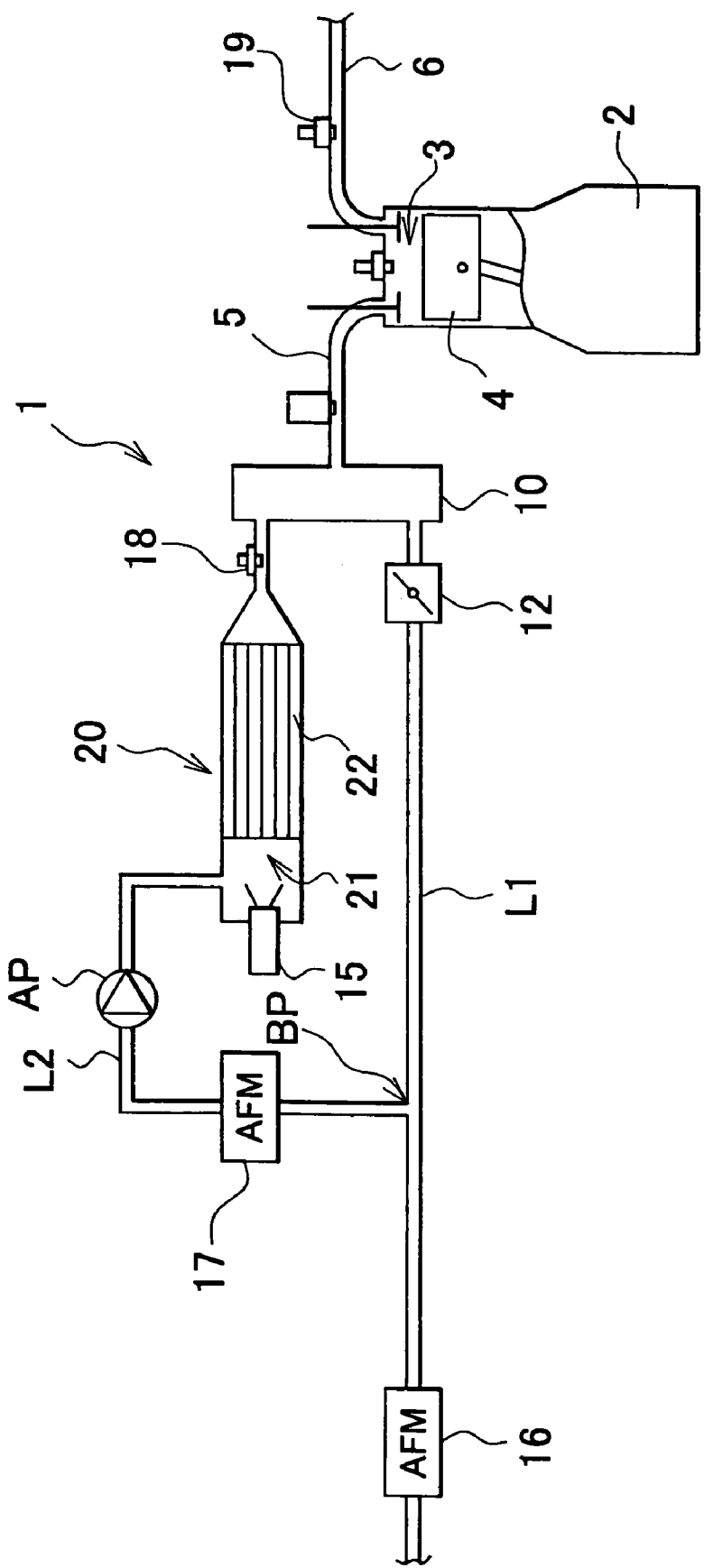
FIG. 7 is a schematic block diagram of an internal combustion engine in accordance with still another modification example of the first embodiment of the invention.

As shown in FIG. 7, an air pump AP may be disposed between the bifurcated portion BP and the reformer 20. In this case, the ECU sets an amount of electric power supplied to the air pump AP such that a value detected by the air flow meter 17 for the bypass pipe L2 coincides with a required supply amount of reformed air. Adoption of this construction also makes it possible to supply the mixture of air and fuel to the reformer 20 with high precision.

Figure 8:
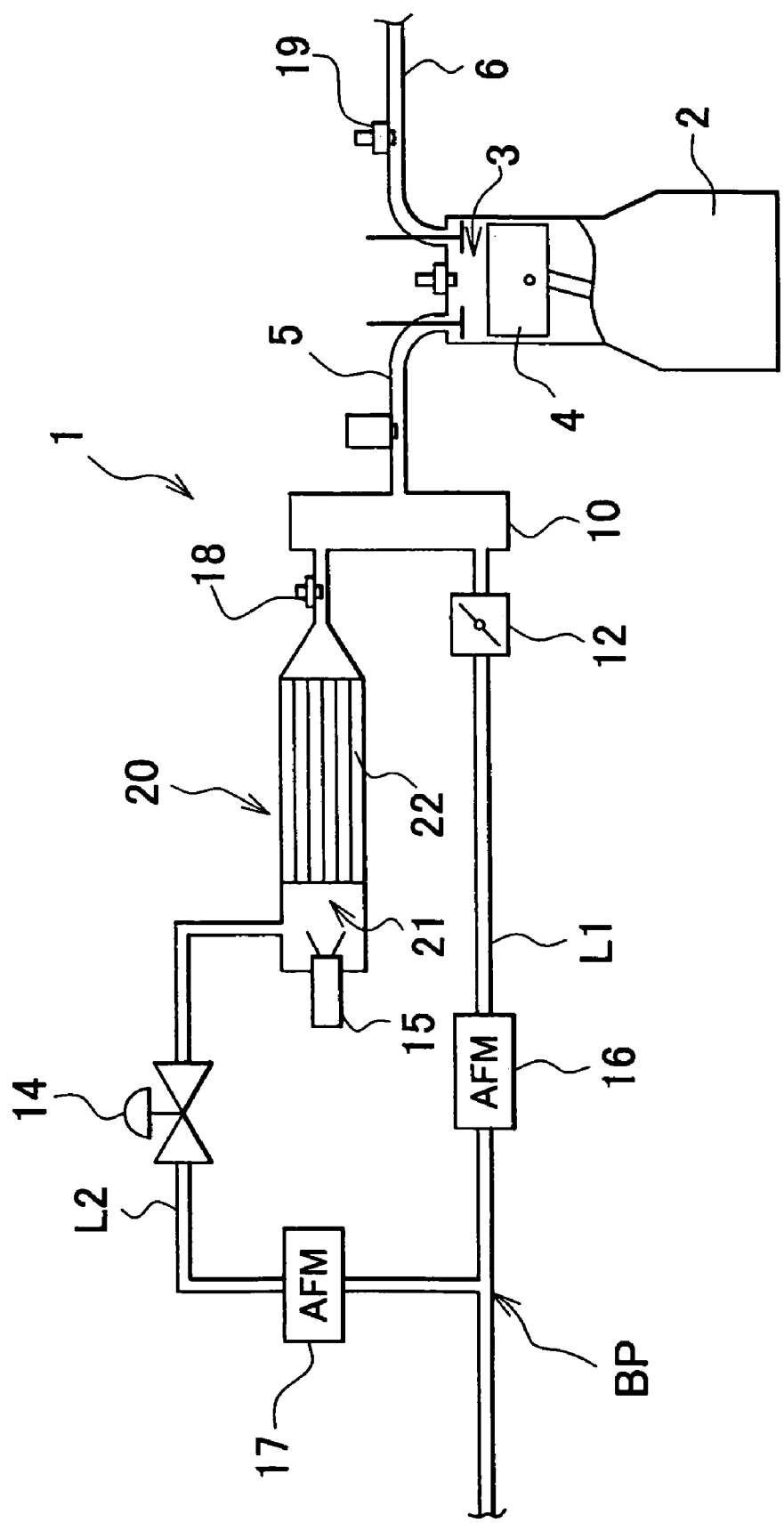
FIG. 8 is a schematic block diagram of an internal combustion engine in accordance with still another modification example of the first embodiment of the invention.
Figure 9:
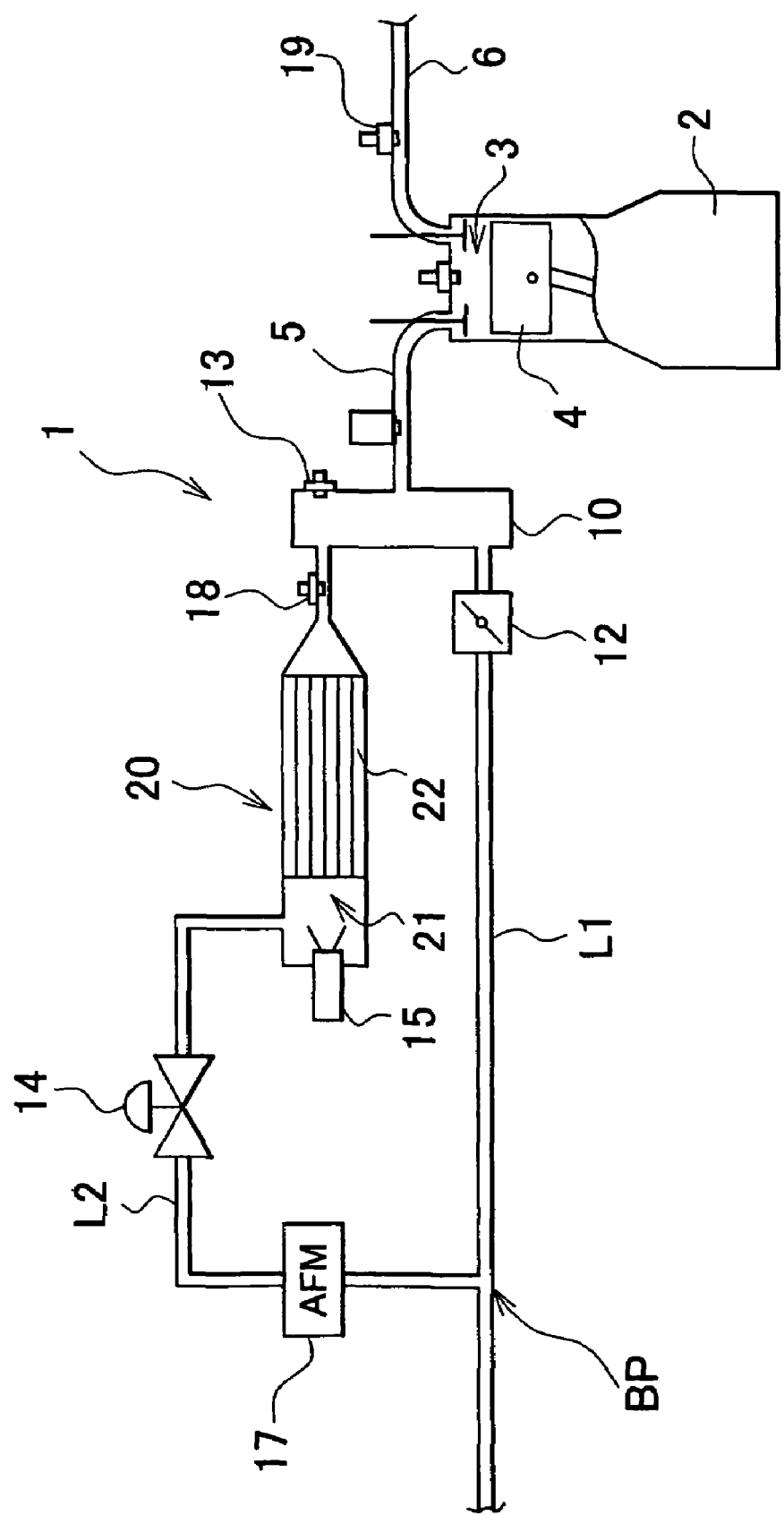
FIG. 9 is a schematic block diagram of an internal combustion engine in accordance with still another modification example of the first embodiment of the invention.

Furthermore, as shown in FIG. 8, the air flow meter 16 for the air-supply pipe L1 may be disposed downstream of the bifurcated portion BP (more specifically, between the bifurcated portion BP and the surge tank 10). In this case, the amount of air eventually supplied to the combustion chambers 3 is the sum of a value detected by the air flow meter 16 and a value detected by the air flow meter 17. As shown in FIG. 9, it is also appropriate that the air flow meter for the air-supply pipe L1 be eliminated, that a pressure sensor 13 be attached to the surge tank 10, and that an amount (air-fuel ratio) of the mixture eventually supplied to the combustion chambers 3 be calculated on the basis of a value detected by the pressure sensor 13. Adoption of these constructions also makes it possible to supply the mixture of air and fuel to the reformer 20 and the combustion chambers 3 with high precision.

As will be described in detail in relation to the second embodiment, since the temperature in the reformer 20 (the temperature of the catalyst bed) is correlated with the air-fuel ratio of the mixture in the reformer 20, an air-fuel ratio (O/C) of the mixture in the reformer 20 can be estimated from a temperature in the reformer 20 (a temperature of the catalyst bed) which is detected by the temperature sensor 18. Thus, the ECU 50 may also be designed to estimate a ratio O/C (air-fuel ratio) of the mixture in the reformer 20 on the basis of a value detected by the temperature sensor 18, and to set an amount of the mixture supplied to the reformer 20 such that the estimated ratio O/C becomes equal to a constant value (e.g., O/C=1) within a range of 0.4 to 1.1, more preferably, within a range of 0.8 to 1.05 and corresponds to a target torque. Adoption of this construction makes it possible to dispense with the air flow meter for the bypass pipe L2, to lower the cost of the entire engine, and to reduce the volume of a required space.

[Second Embodiment]

Hereinafter, an internal combustion engine in accordance with the second embodiment of the invention will be described with reference to FIGS. 10 to 21. Components identical with those described in relation to the aforementioned first embodiment are denoted by the same reference numerals, and repetition of the same description will be avoided.

Figure 10:
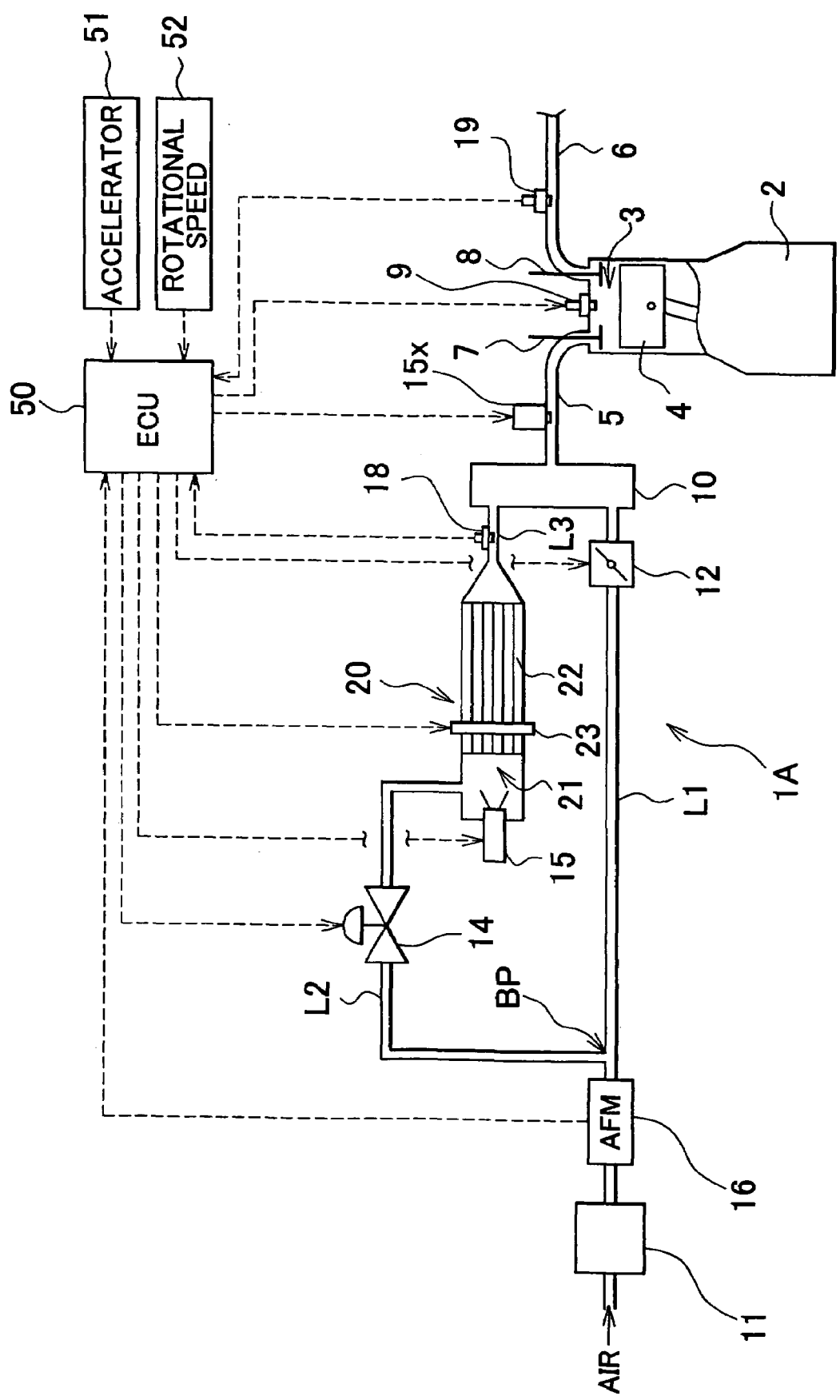
FIG. 10 is a schematic block diagram of an internal combustion engine in accordance with a second embodiment of the invention.

An internal combustion engine 1A shown in FIG. 10 is basically identical in construction with the internal combustion engine 1 in accordance with the aforementioned first embodiment. In the internal combustion engine 1A in accordance with the second embodiment, however, the air flow meter disposed upstream of the reformer 20 is removed from the bypass pipe L2 with a view to lowering the cost of the engine as a whole and reducing the volume of a required space. In the internal combustion engine 1A, a pre-heater 23 such as an electric heater or the like is disposed at an upstream end portion of the reforming reaction portion 22 (i.e., at an end portion on the side of the air-fuel mixing portion 21). Hereinafter, it will be described individually and specifically how the internal combustion engine 1A thus constructed operates when the engine is in an idling-off state, when the engine is in an idling state, when the reformer is started, and when the reformer is stopped.

(When Engine is in Idling-Off State)

Figure 11:
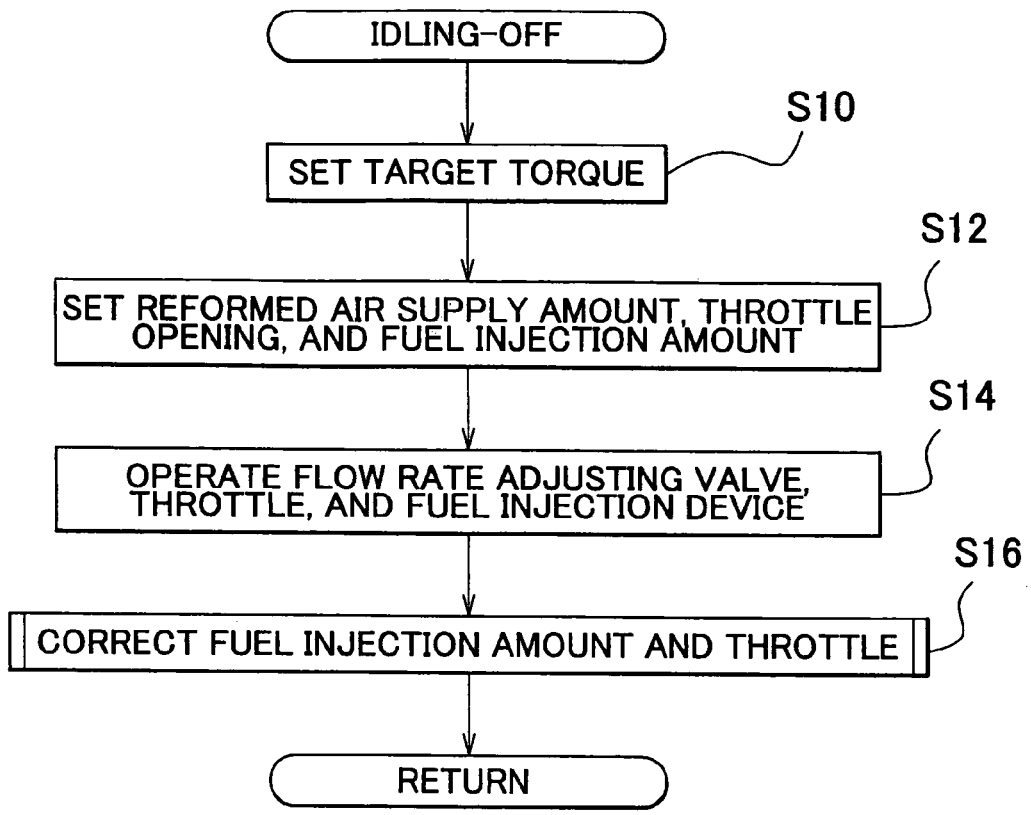
FIG. 11 is a flowchart for explaining operation of the internal combustion engine shown in FIG. 10.

As shown in FIG. 11, if a shift from an idling state to an idling-off state is made in response to delivery of a signal indicating an accelerator depression stroke to the ECU 50 from the accelerator 51, the ECU 50 determines a target torque of the internal combustion engine 1A corresponding to the signal delivered from the accelerator 51 (S10). After having determined the target torque, the ECU 50 simultaneously sets an amount of air to be supplied to the reformer 20 (a reformed air supply amount), an amount of fuel injected from the fuel injection device 15, and an opening of the electronic throttle 12 (S12).

Figure 12:
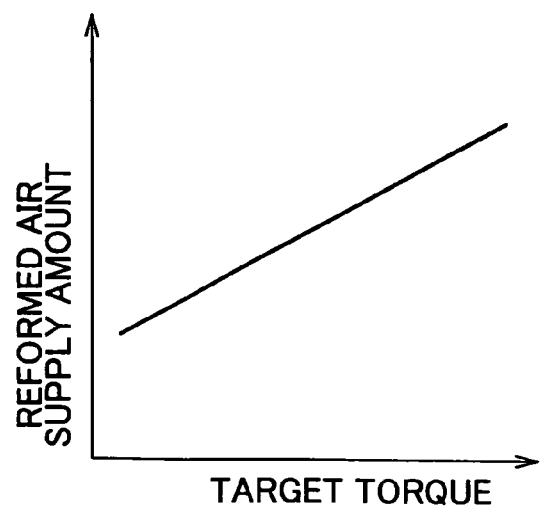
FIG. 12 is a pattern diagram showing an exemplary map that is used to set a reformed air supply amount.

That is, in S12, the ECU 50 calculates a reformed air supply amount corresponding to the target torque determined in S10 from an exemplary map shown in FIG. 12, and calculates an amount of fuel injected from the fuel injection device 15 in relation to the reformed air supply amount thus calculated such that the ratio O/C of the mixture in the reformer 20 becomes equal to 1. At the same time, in S12, the ECU 50 calculates an opening of the electronic throttle 12 corresponding to the target torque determined in S10 from an exemplary map shown in FIG. 13.

Figure 13:
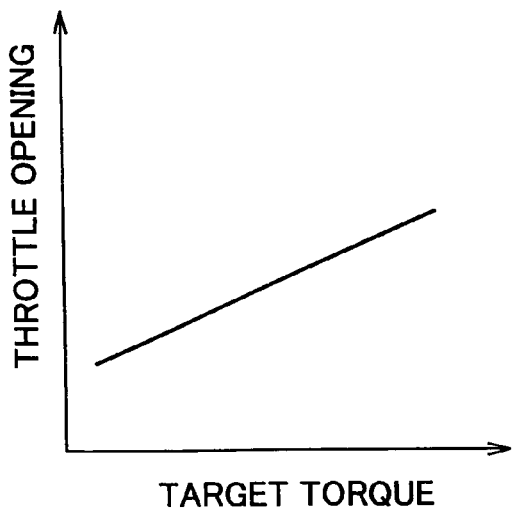
FIG. 13 is a pattern diagram showing an exemplary map that is used to set a throttle opening.

The map for setting a reformed air supply amount as shown in FIG. 12 is so prepared in advance as to define a relationship between the target torque of the engine and the amount of air to be supplied to the reformer 20 (reformed air supply amount), and is stored in the storage unit of the ECU 50. The map for setting a throttle opening as shown in FIG. 13 is so prepared in advance as to define an opening of the electronic throttle 12 for equalizing an air-fuel ratio of the mixture absorbed into the combustion chambers 3 with a desired value in accordance with a target torque, in consideration of the reformed air supply amount calculated from the map shown in FIG. 12 and the fuel injection amount that is calculated such that the ratio O/C of the mixture in the reformer 20 becomes equal to 1. The map for setting a throttle opening is also stored in the storage unit of the ECU 50.

Thereby, in the processing of S12, both an amount of the mixture supplied to the reformer 20 (i.e., reformed air supply amount+fuel injection amount) and an amount of the mixture absorbed into the combustion chambers 3 (i.e., reformed gas+air flowing from the electronic throttle 12) are simultaneously set in accordance with a target torque. The air-fuel ratio of the mixture in the reformer 20 is set substantially constant (O/C=1), and the air-fuel ratio of the mixture in the combustion chambers 3 is set, for example, as a desired value such as a stoichiometric air-fuel ratio or the like.

Then in S14, the ECU 50 sets an opening of the electronic throttle 12 as the opening calculated in S12, controls the flow rate adjusting valve 14 such that a value indicated by the air flow meter 16 for the air-supply pipe L1 becomes equal to the sum of the reformed air supply amount calculated in S12 and a flow amount corresponding to the opening of the electronic throttle 12 calculated in S12, and causes the fuel injection device 15 to inject the amount of fuel calculated in S12. In this case, in order to precisely set an air-fuel ratio of the mixture in the reformer 20, it is preferable that fuel be injected from the fuel injection device 15 as soon as the supply of air from the flow rate adjusting valve 14 stabilizes.

After having performed the processing of S14, the ECU 50 proceeds to S16 and executes a fuel injection correction routine (FIG. 14) and a throttle opening correction routine (FIG. 17), which will be described below. Thus, the air-fuel ratio of the mixture in the combustion chambers 3 can be set as a desired value while the reforming efficiency of the reformer 20 is held substantially constant, and an actual output torque can be precisely equalized with a target torque. While the engine remains in the idling-off state, the aforementioned processings of S10 to S16 are repeated.

Figure 14:
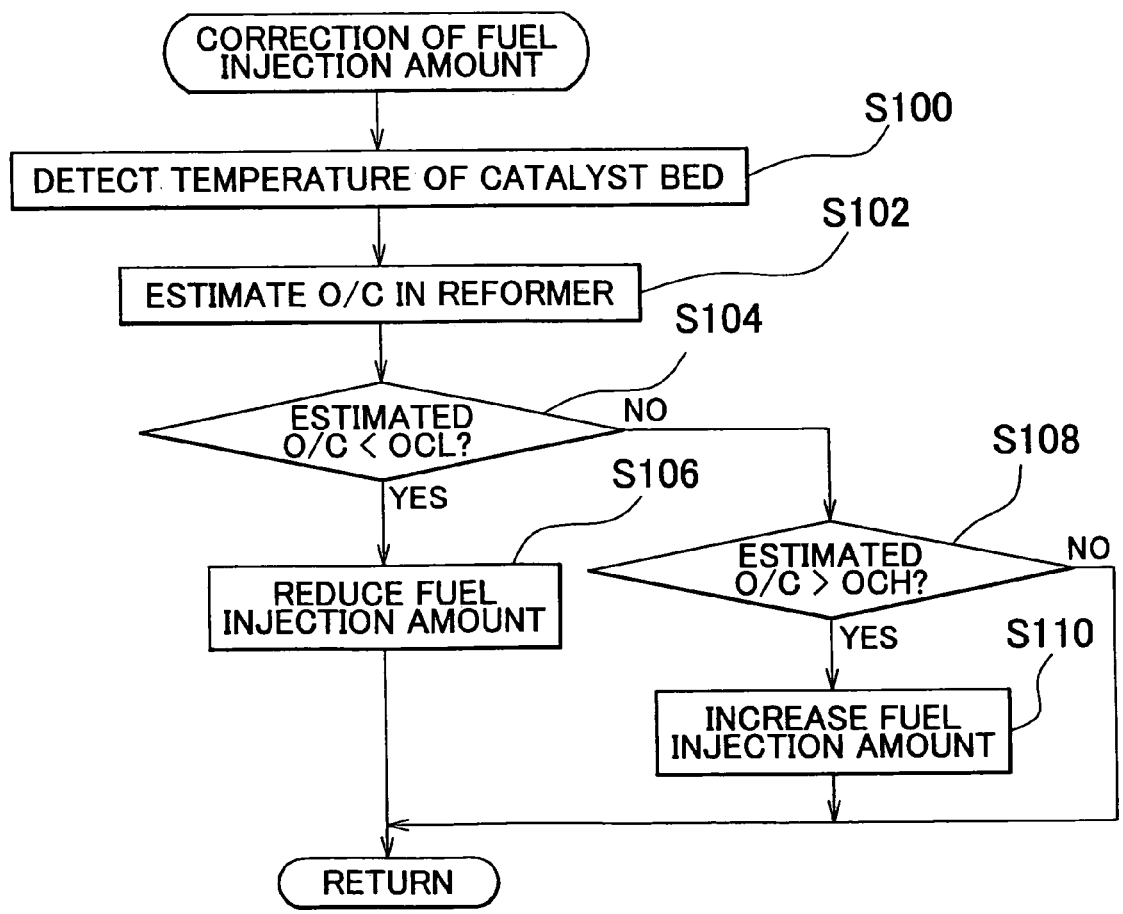
FIG. 14 is a flowchart for explaining operation of the internal combustion engine shown in FIG. 10.
Figure 15:
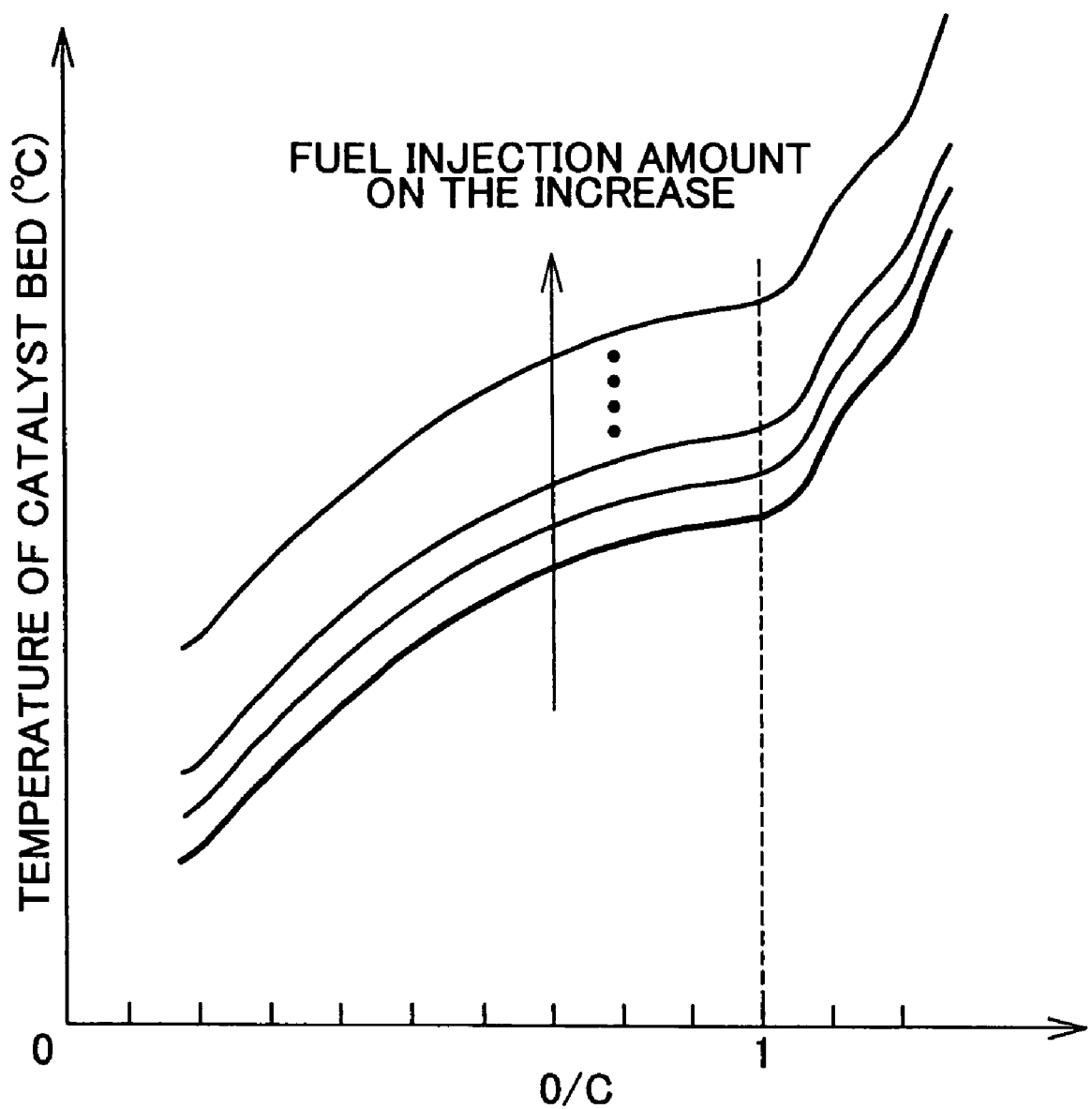
FIG. 15 is a pattern diagram showing an exemplary map that is used to estimate an air-fuel ratio of a mixture in the reformer.

FIG. 14 is a flowchart for explaining the fuel injection amount correction routine in S16. As shown in FIG. 14, after having performed the processing in S14, the ECU 50 calculates a temperature of the catalyst bed in the reforming reaction portion 22 of the reformer 20 on the basis of a signal received from the temperature sensor 18 attached to the connecting pipe L3 (S100). After having calculated the temperature of the catalyst bed in the reformer 20, the ECU 50 estimates an air-fuel ratio (O/C) of the mixture in the reformer 20, using the calculated temperature of the catalyst bed, the fuel injection amount determined in S12, and an exemplary map shown in FIG. 15 (S102).

The temperature of the catalyst bed is correlated with the ratio O/C of the mixture (air-fuel ratio) in the reformer 20, and the temperature of the catalyst bed in the reforming reaction portion 22 changes in accordance with the ratio O/C of the mixture in the reformer 20. The temperature of the catalyst bed also changes in accordance with the amount of fuel supplied to the reformer 20. The temperature of the catalyst bed rises as the amount of fuel supplied to the reformer 20 increases. In view of the foregoing, in the internal combustion engine 1A, the map (FIG. 15) for defining (correcting) a correlation between the temperature of the catalyst bed and the ratio O/C of the mixture in the reformer 20 in accordance with an amount of fuel injected into the reformer 20 is prepared in advance and stored in the storage unit of the ECU 50. By using such a map, a ratio O/C of the mixture (air-fuel ratio) in the reformer 20 can be calculated with high precision from a temperature of the catalyst bed in the reforming reaction portion 22 and an amount of fuel supplied to the reformer 20.

After having estimated a ratio O/C of the mixture in the reformer 20, the ECU 50 determines whether or not an estimated value of the ratio O/C is below a first threshold OCL determined in advance (S104). The first threshold OCL is set, for example, as a value that is smaller than a target value of the ratio O/C determined in S12 by a predetermined value (a predetermined percentage). If it is determined in S104 that the estimated value of the ratio O/C is below the threshold OCL, the ECU 50 (slightly) reduces an amount of fuel injected from the fuel injection device 15 by a predetermined amount or an amount corresponding to a difference between the estimated value of the ratio O/C and the threshold OCL (S106). Because the mixture in the reformer 20 is thereby made lean, the ratio O/C can be increased and made close to a target value (1 in the second embodiment).

On the other hand, if it is determined in S104 that the estimated value of the ratio O/C is not below the predetermined value OCL, the ECU 50 further determines whether or not the estimated value of the ratio O/C is above a second threshold OCH determined in advance (S108). The second threshold OCH is set, for example, as a value that is larger than the target value of the ratio O/C determined in S12 by a predetermined amount (a predetermined percentage). If it is determined in S108 that the estimated value of the ratio O/C is above the threshold OCH, the ECU 50 (slightly) increases an amount of fuel injected from the fuel injection device 15 by a predetermined amount or an amount corresponding to a difference between the estimated value of the ratio O/C and the threshold OCH (S110). Because the mixture in the reformer 20 is thereby made rich, the ratio O/C can be made smaller than the threshold OCH and close to the target value (1 in the second embodiment).

Thus, in the internal combustion engine 1A, the fuel injection amount correction routine is executed, and the amount of fuel supplied to the reformer 20 is suitably subjected to feedback correction using the estimated ratio O/C of the mixture in the reformer 20. Therefore, the ratio O/C in the reformer 20 can be held constant, and the reforming efficiency can be excellently held within a desired range. After having terminated the processing of S106 or S110, the ECU 50 performs the basic processings shown in FIG. 11 again. If it is determined in S108 that the estimated value of the ratio O/C is not above the second threshold OCH, the ECU 50 performs the basic processings shown in FIG. 11 again without correcting a fuel injection amount.

As described above, it is in the case where the ratio O/C is held approximately within the range of 0.8 to 1.05 that the reforming efficiency of the reformer 20 is good for practical purposes. As is apparent from FIG. 15, however, if the ratio O/C is approximately within the range of 0.8 to 1.05, the fluctuation of the temperature of the catalyst bed is also held within a predetermined range. On the other hand, for example, if the ratio O/C is larger than about 1.05, a fluctuation amount $\Delta T$ of the temperature of the catalyst bed for each fluctuation of the ratio O/C (i.e., a fluctuation amount of the temperature of the catalyst bed before and after the processing in S200) is larger than a predetermined value $\Delta T1$. In view of this, in order to hold the reforming efficiency of the reformer 20 within a desired range, a fuel injection amount may also be corrected on the basis of a fluctuation amount $\Delta T$ of the temperature of the catalyst bed as shown in FIG. 16.

Figure 16:
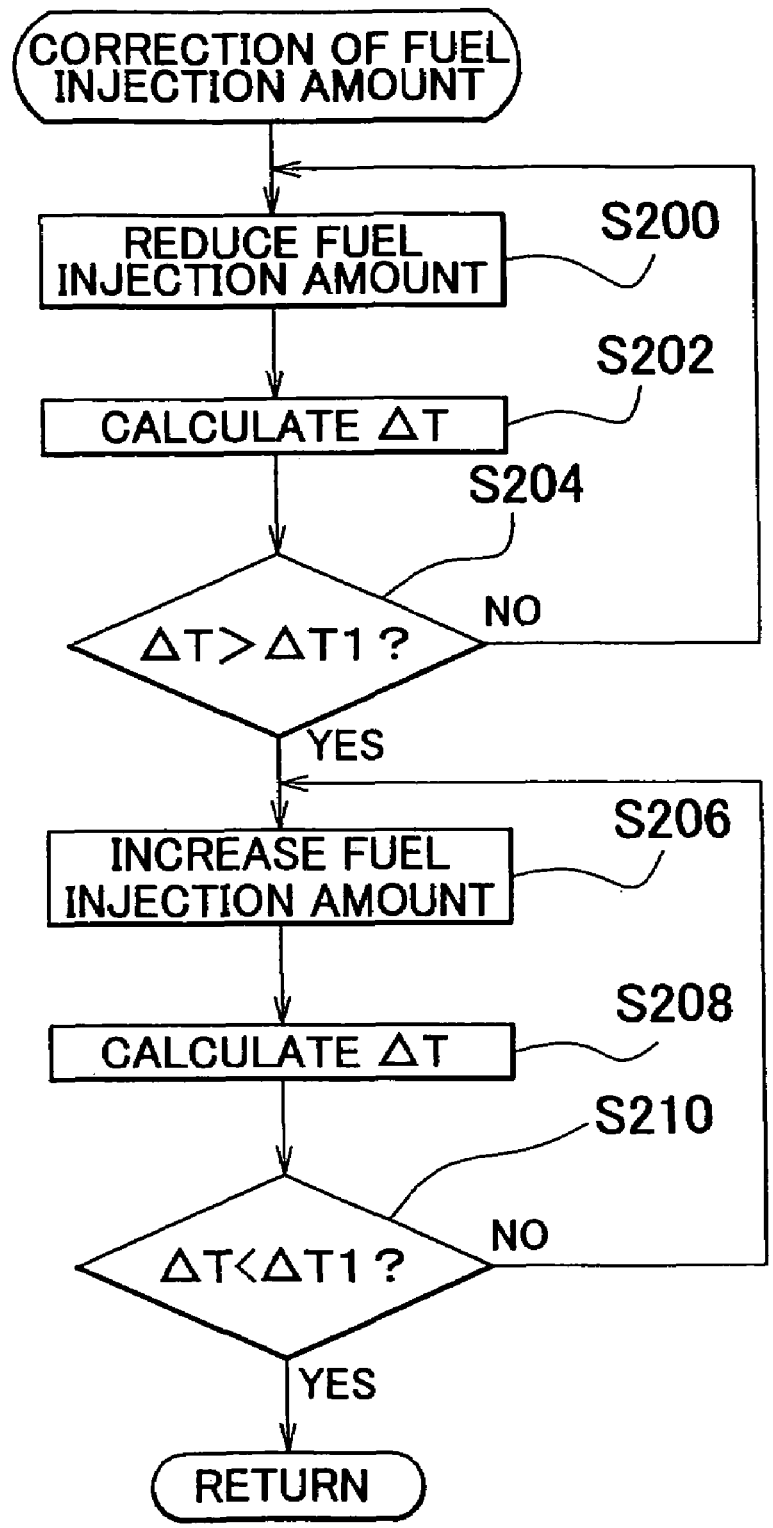
FIG. 16 is a flowchart for explaining operation of the internal combustion engine shown in FIG. 10.

In an example shown in FIG. 16, after having performed the processing of S14, the ECU 50 temporarily (slightly) reduces an amount of fuel injected from the fuel injection device 15 and thereby makes the mixture in the reformer 20 lean (S200). After having made the mixture in the reformer 20 lean, the ECU 50 calculates a fluctuation amount $\Delta T$ of the temperature of the catalyst bed after the processing of S200 on the basis of a signal output from the temperature sensor 18 (S202), and determines whether or not the calculated fluctuation amount $\Delta T$ of the catalyst is above the predetermined value $\Delta T1$ (S204). If it is determined in S204 that the fluctuation amount $\Delta T$ of the temperature of the catalyst bed is not above the predetermined value $\Delta T1$, the ECU 50 repeats the processings of S200 to S204.

On the other hand, if it is determined in S204 that the fluctuation amount $\Delta T$ of the temperature of the catalyst bed is above the predetermined value $\Delta T1$, the ECU 50 increases an amount of fuel injected from the fuel injection device 15 by a predetermined amount (a predetermined percentage) so as to make the mixture in the reformer 20 rich (S206). After having made the mixture in the reformer 20 rich, the ECU 50 calculates a fluctuation amount $\Delta T$ of the temperature of the catalyst bed after the processing of S206 on the basis of a signal output from the temperature sensor 18 (S208), and determines whether or not the calculated fluctuation amount $\Delta T$ of the temperature of the catalyst bed is below the predetermined value $\Delta T1$ (S210). If it is determined in S210 that the fluctuation amount $\Delta T$ of the temperature of the catalyst bed is not below the predetermined value $\Delta T1$, the ECU 50 repeats the processings of S206 to S210. If it is determined in S210 that the fluctuation amount $\Delta T$ of the temperature of the catalyst bed is below the predetermined value $\Delta T1$, the ECU 50 returns to the basic processings shown in FIG. 11. If the fuel injection amount correction routine is executed according to the procedure described hitherto, the amount of fuel supplied to the reformer 20 is corrected such that the ratio O/C of the mixture in the reformer 20 is held at a substantially constant value that is not above an inflection point in the vicinity of O/C=1. Therefore, the reforming efficiency of the reformer 20 can be excellently held within a desired range.

Figure 17:
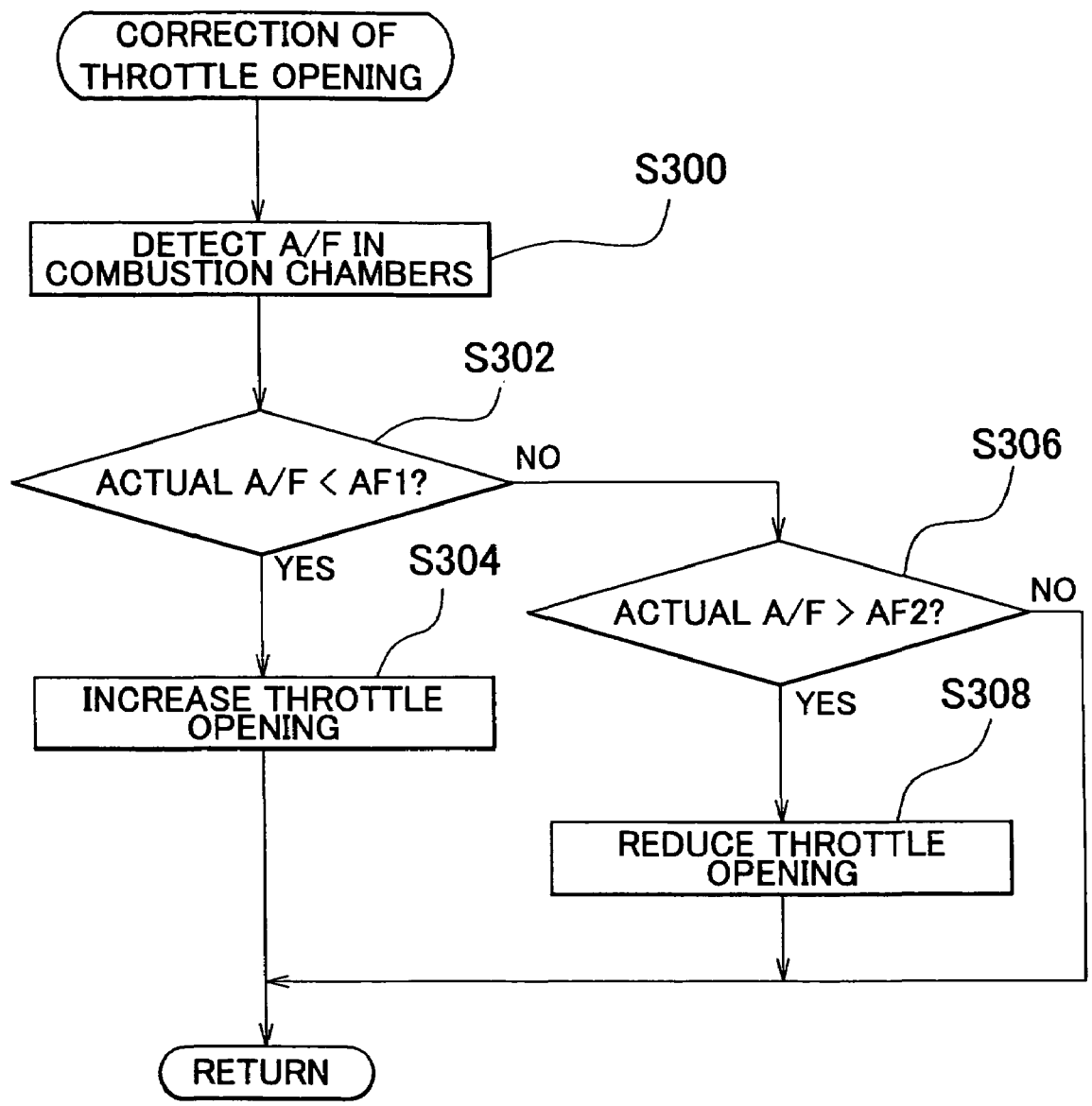
FIG. 17 is a flowchart for explaining operation of the internal combustion engine shown in FIG. 10.

FIG. 17 is a flowchart for explaining the throttle opening correction routine in S16. As shown in FIG. 17, after having performed the processing of S14, the ECU 50 calculates an air-fuel ratio in the combustion chambers 3 on the basis of a signal received from the exhaust gas A/F sensor 19 attached to the exhaust pipe 6 (S300). After having calculated the air-fuel ratio in the combustion chambers 3, the ECU 50 determines whether or not the calculated air-fuel ratio in the combustion chambers 3 is below a first threshold AF1 determined in advance (S302). The first threshold AF1 is determined, for example, as a value that is smaller than a target air-fuel ratio in the combustion chambers 3 by a predetermined amount (a predetermined percentage). The target air-fuel ratio in the combustion chambers 3 is determined by an engine rotational speed, an engine load state, and the like.

If it is determined in S302 that the air-fuel ratio in the combustion chambers 3 is below the threshold AF1, the ECU 50 (slightly) increases an opening of the electronic throttle 12 by a predetermined amount or an amount corresponding to a difference between the air-fuel ratio in the combustion chambers 3 and the threshold AF1, so as to make the mixture supplied to the combustion chambers 3 lean (S304). On the other hand, if it is determined in S302 that the air-fuel ratio in the combustion chambers 3 is not below the threshold AF1, the ECU 50 further determines whether or not the calculated air-fuel ratio in the combustion chambers 3 is above a second threshold AF2 (S306). The second threshold AF2 is determined, for example, as a value that is larger than a target air-fuel ratio in the combustion chambers 3 by a predetermined value (a predetermined percentage). The target air-fuel ratio in the combustion chambers 3 is determined by an engine rotational speed, an engine load state, and the like. If it is determined in S306 that the air-fuel ratio in the combustion chambers 3 is above the threshold AF2, the ECU 50 (slightly) reduces an opening of the electronic throttle 12 by a predetermined amount or an amount corresponding to a difference between the air-fuel ratio in the combustion chambers 3 and the threshold AF2, so as to make the mixture supplied to the combustion chambers 3 rich (S308).

Thus, in the internal combustion engine 1A, the throttle opening correction routine is executed, and the opening of the electronic throttle 12 is suitably subjected to feedback correction using an air-fuel ratio of the mixture in the combustion chambers 3. Therefore, the air-fuel ratio of the mixture in the combustion chambers 3 can be precisely set as a desired value. After having terminated the processing in S304 or S308, the ECU 50 performs the basic processings shown in FIG. 11 again. If it is determined in S306 that the air-fuel ratio in the combustion chambers 3 is not above the threshold AF2, the ECU 50 performs the basic processings shown in FIG. 11 again without correcting a throttle opening.

(When Engine is in Idling State)

Figure 18:
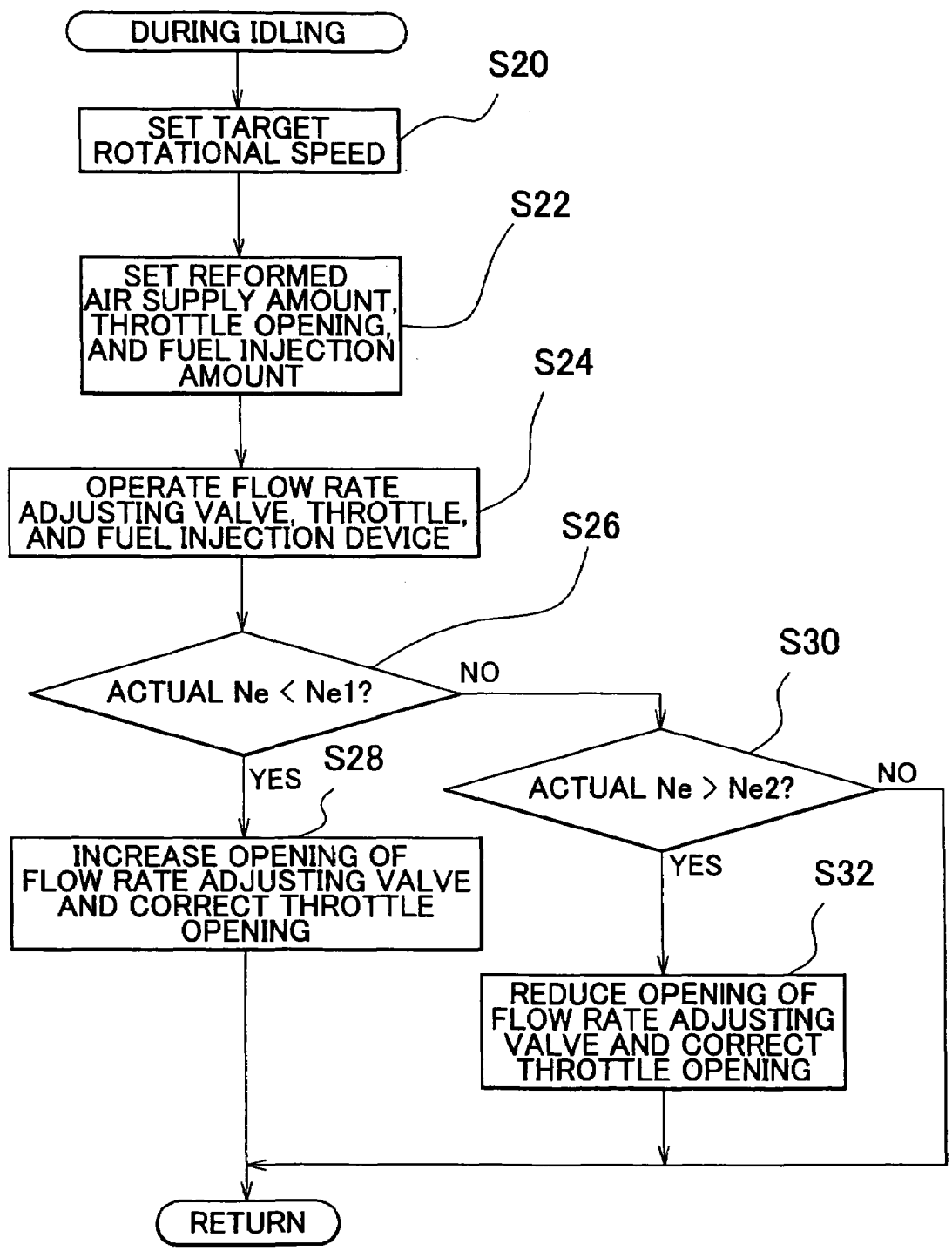
FIG. 18 is a flowchart for explaining operation of the internal combustion engine shown in FIG. 10.

As shown in FIG. 18, when the internal combustion engine 1A is in an idling state, the ECU 50 determines a target rotational speed of the internal combustion engine 1A (S20). After having determined the target rotational speed, the ECU 50 simultaneously sets an amount of air to be supplied to the reformer 20 (reformed air supply amount), an amount of fuel injected from the fuel injection device 15, and an opening of the electronic throttle 12 (S22).

In this case, in S22, the ECU 50 calculates a reformed air supply amount corresponding to the target rotational speed from a map (not shown) that is so prepared in advance as to define a relationship between the target rotational speed of the engine and the amount of air to be supplied to the reformer 20 (reformed air supply amount). In S22, the ECU 50 calculates an amount of fuel injected from the fuel injection device 15 in relation to the reformed air supply amount thus calculated such that the ratio O/C of the mixture in the reformer 20 becomes equal to 1. Moreover, in S22, the ECU 50 calculates an opening of the electronic throttle 12 from a map that is so prepared in advance as to define an opening of the electronic throttle 12 for equalizing an air-fuel ratio of the mixture absorbed into the combustion chambers 3 with a desired value in accordance with a target rotational speed, in consideration of a reformed air supply amount calculated from the map and a fuel injection amount that is calculated such that the ratio O/C of the mixture in the reformer 20 becomes equal to 1.

Thereby, in the processing of S22, both an amount of the mixture supplied to the reformer 20 (i.e., reformed air supply amount+fuel injection amount) and an amount of the mixture absorbed into the combustion chambers 3 (i.e., reformed gas+air flowing from the electronic throttle 12) are simultaneously set in accordance with a target rotational speed. The air-fuel ratio of the mixture in the reformer 20 is set substantially constant (O/C=1), and the air-fuel ratio of the mixture in the combustion chambers 3 is set as a desired value corresponding to an engine rotational speed, an engine load state, or the like.

In S24, the ECU 50 sets an opening of the electronic throttle 12 as the opening calculated in S22, controls the flow rate adjusting valve 14 such that a value indicated by the air flow meter 16 for the air-supply pipe L1 becomes equal to the sum of the reformed air supply amount calculated in S22 and a flow amount corresponding to the opening of the electronic throttle 12 calculated in S22, and causes the fuel injection device 15 to inject the amount of fuel calculated in S22. After having performed the processing of S24, the ECU 50 calculates an actual rotational speed of the internal combustion engine 1A on the basis of a signal output from the rotational speed sensor 52, and determines whether or not the calculated actual rotational speed is below a threshold Ne1 that is lower than the target rotational speed determined in S20 by a predetermined value (a predetermined percentage) (S26). If it is determined in S26 that the actual rotational speed is below the threshold Ne1, the ECU 50 controls the flow rate adjusting valve 14 so as to increase a reformed air supply amount (S28). In this case, the fuel injection amount is calculated in S22 such that the ratio O/C of the mixture in the reformer 20 becomes equal to 1. Therefore, if the reformed air supply amount increases, the fuel injection amount also increases correspondingly. In order to maintain the air-fuel ratio of the mixture in the combustion chambers 3 at a desired value, the ECU 50 adjusts an opening of the electronic throttle 12 in accordance with an increase in reformed air supply amount and an increase in fuel injection amount.

If it is determined in S26 that the actual rotational speed is not below the threshold Ne1, the ECU 50 further determines whether or not the calculated actual rotational speed is above a threshold Ne2 that is higher than the target rotational speed determined in S20 by a predetermined value (a predetermined percentage) (S30). If it is determined in S30 that the actual rotational speed is above the threshold Ne2, the ECU 50 controls the flow rate adjusting valve 14 so as to reduce a reformed air supply amount (S32). In this case as well, the fuel injection amount is calculated in S22 such that the ratio O/C of the mixture in the reformer 20 becomes equal to 1. Therefore, if the reformed air supply amount decreases, the fuel injection amount also decreases correspondingly. In order to maintain the air-fuel ratio of the mixture in the combustion chambers 3 at a desired value, the ECU 50 adjusts an opening of the electronic throttle 12 in accordance with a decrease in reformed air supply amount and a decrease in fuel injection amount. On the other hand, if it is determined in S30 that the actual rotational speed is not above the threshold Ne2, the reformed air supply amount is not corrected. While the engine remains in the idling state, the aforementioned processings of S20 to S32 are repeated. Thereby, even when the internal combustion engine 1A is in the idling state, an actual output torque can be precisely equalized with a target torque while the reforming efficiency of the reformer 20 is held substantially constant.

(When the Reformer is Started)

Figure 19:
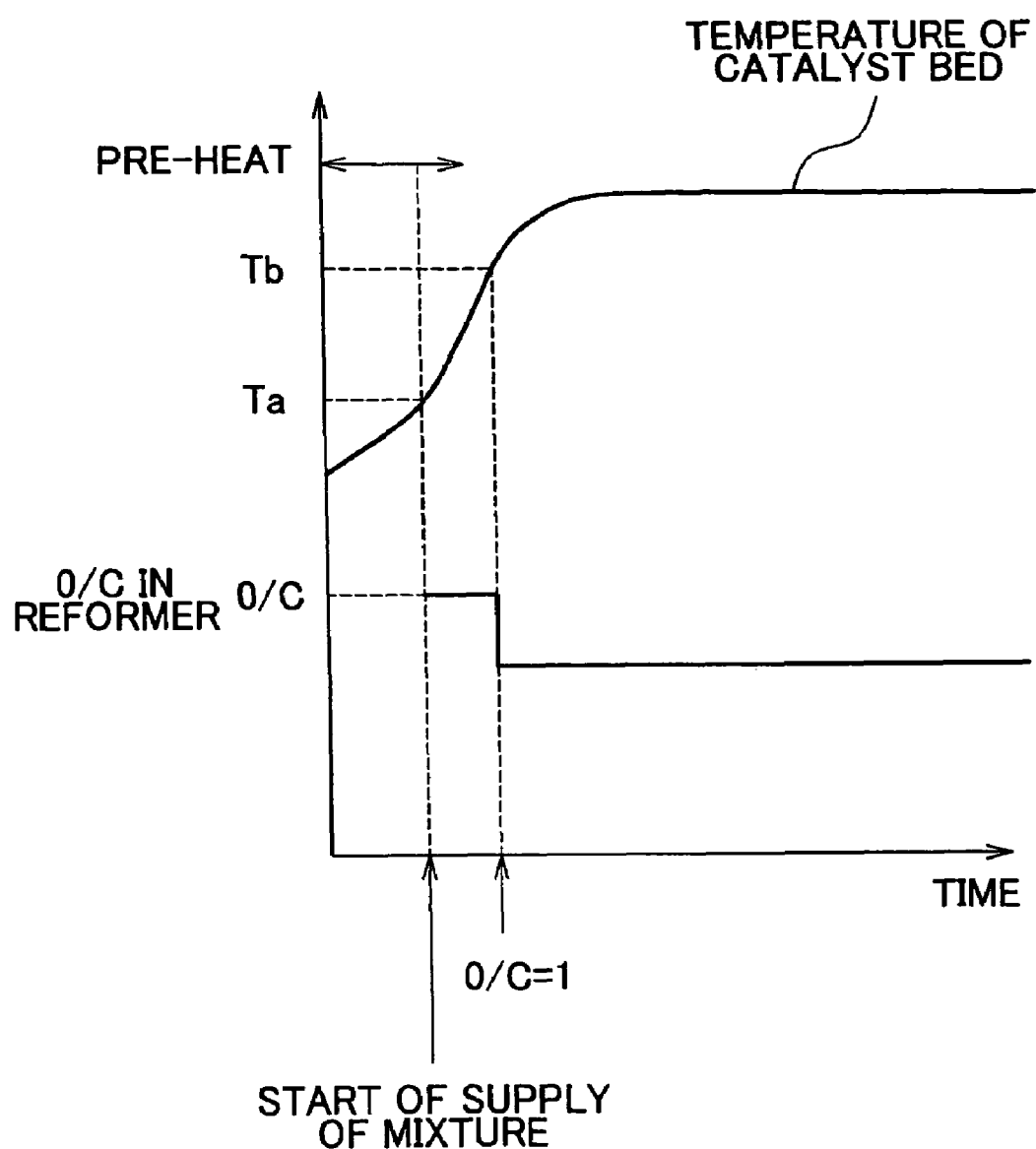
FIG. 19 is a flowchart for explaining operation of the internal combustion engine shown in FIG. 10.
Figure 20:
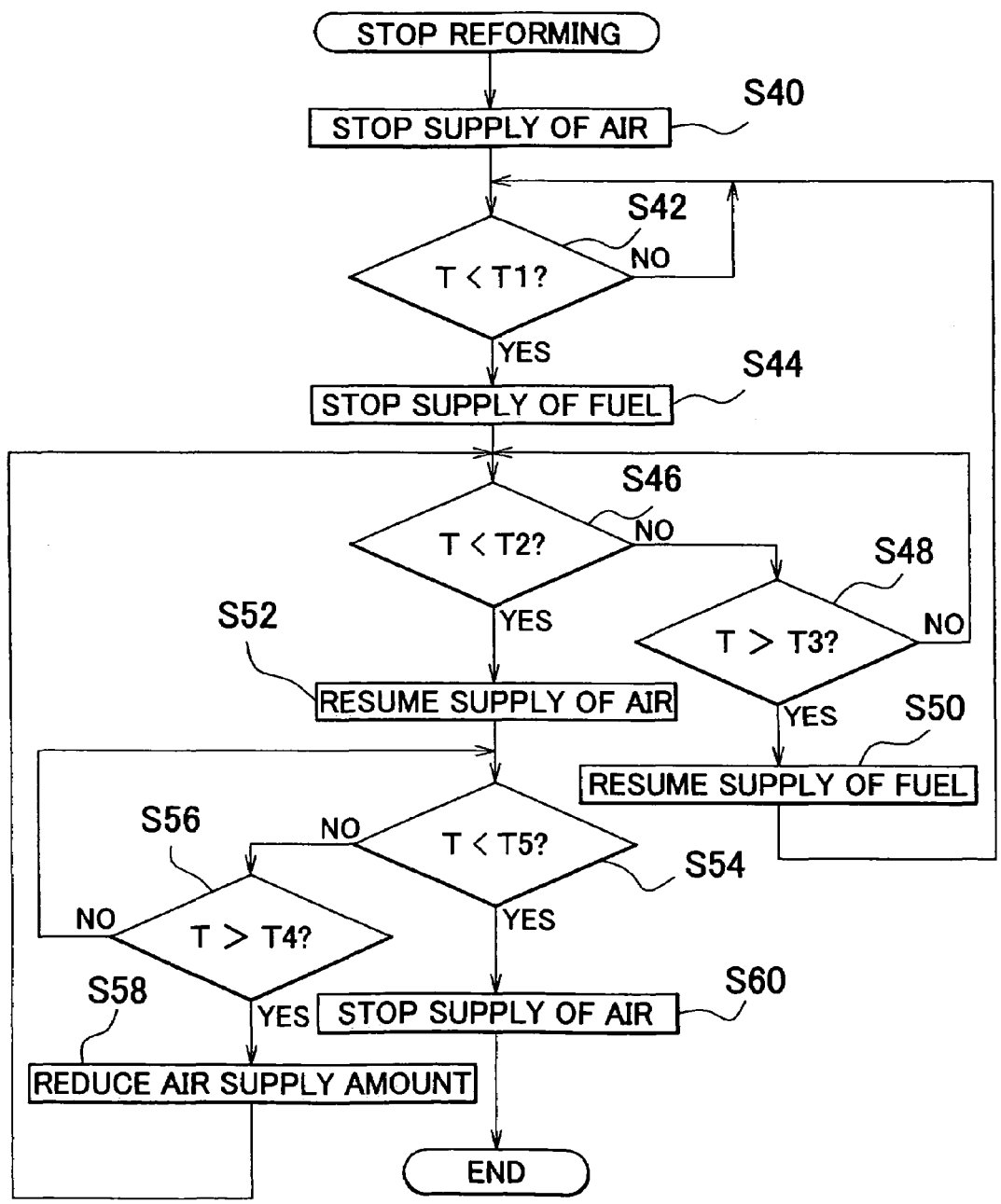
FIG. 20 is a flowchart for explaining operation of the internal combustion engine shown in FIG. 10.

When the supply of the mixture to the reformer 20 is started to start the internal combustion engine 1A, the reforming catalyst in the reforming reaction portion 22 is often not activated sufficiently. Hence, in starting the supply of the mixture to the reformer 20, the ECU 50 first operates the pre-heater 23 disposed at the upstream end of the reforming reaction portion 22, as shown in FIG. 19. Thus, the temperature of the catalyst bed in the reforming reaction portion 22 of the reformer 20 gradually rises. After the pre-heater 23 has started to operate, the ECU 50 monitors a temperature of the catalyst bed (a temperature in the reformer 20) detected by the temperature sensor 18.

If it is determined on the basis of a signal output from the temperature sensor 18 that the temperature of the catalyst bed has reached a predetermined temperature Ta, the ECU 50 starts the supply of air to the reformer 20 from the flow rate adjusting valve 14 and the injection of fuel from the fuel injection device 15. In this case, as shown in FIG. 19, the ECU 50 controls the flow rate adjusting valve 14 and the fuel injection device 15 such that the ratio O/C of the mixture in the reformer 20 becomes equal to a predetermined value that is larger than 1.

Thus, in the internal combustion engine 1A, when the supply of the mixture to the reformer 20 is started, the mixture in the reformer 20 is made leaner (O/C>1) than the mixture during steady operation (O/C=1). Thus, a complete oxidation reaction expressed by a formula (2) shown below is likely to progress in the reforming reaction portion 22. The complete oxidation reaction generates a larger amount of heat than the partial oxidation reaction expressed by the formula (1) mentioned above.

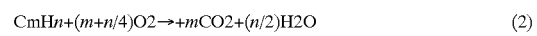

$$CmHn+(m+n/4)O2 \rightarrow +mCO2+(n/2)H2O \qquad (2)$$

As a result, in the internal combustion engine 1A, ignition of fuel in the reforming catalyst is promoted immediately after the supply of the mixture to the reformer 20 has been started. As shown in FIG. 19, the reforming catalyst can be heated up to an activation temperature Tb in a short period by increasing a degree of rise (change amount) in temperature of the catalyst. Adoption of this construction makes it possible to stop preheating (i.e., to shorten a preheating period) or to lower a preheating temperature (i.e., to reduce the amount of electric power supplied to the pre-heater 23) before the reforming catalyst reaches the activation temperature Tb as shown in FIG. 19.

If it is determined on the basis of a signal output from the temperature sensor 18 that the temperature of the catalyst bed has reached the predetermined temperature Tb, the ECU 50 sets the ratio O/C of the mixture in the reformer 20 as 1, which is a value corresponding to steady operation of the engine. Thus, the reforming efficiency of the reformer 20 is held within a desired range, and the reforming catalyst is inhibited from being heated up excessively.

(When the Reformer is Stopped) If the supply of the mixture to the reformer 20 is stopped to stop the internal combustion engine 1A or to operate the internal combustion engine 1A by causing the fuel injection device 15x attached to the intake pipe 5 to inject fuel during so-called cold start, the amount of oxygen in the reforming reaction portion 22 of the reformer 20 may temporarily become excessive, so that the temperature of the catalyst bed may abruptly rise to the extent of deteriorating the reforming catalyst. To prevent this phenomenon, the supply of the mixture to the reformer 20 is stopped in the internal combustion engine 1A according to a procedure shown in FIGS. 20 and 21.

In this case, upon receiving a command to stop supplying the mixture to the reformer 20, the ECU 50 first closes the flow rate adjusting valve 14 completely and stops the supply of air via the bypass pipe 12 completely (S40). After having closed the flow rate adjusting valve 14, the ECU 50 determines on the basis of a signal output from the temperature sensor 18 whether or not a temperature T of the catalyst bed in the reforming reaction portion 22 is below a predetermined temperature T1 (S42). If it is determined in S42 that the temperature T of the catalyst bed is below the predetermined temperature T1, the ECU 50 stops the fuel injection device 15 and stops supplying fuel to the reformer 20 (S44).

Thus, in the internal combustion engine 1A, the supply of air is stopped before the supply of fuel to the reformer 20 is stopped. Thereby, the amount of oxygen in the reformer 20 can be prevented from becoming excessive, and the reaction in the reforming reaction portion 22 can be inhibited from progressing. Also, the reforming catalyst (the reformer 20) can be cooled and be reliably inhibited from deteriorating as a result of an abrupt rise in temperature. In the second embodiment, the flow rate adjusting valve 14 is completely closed and the supply of air via the bypass pipe L2 is completely stopped in S40. However, the invention is not limited to this construction. Namely, the processing of S40 has only to reduce the amount of air supplied to the reformer 20. For example, it is appropriate that the amount of air to be supplied be reduced to about 50% of an amount of previously supplied air.

After having stopped supplying fuel to the reformer 20 in S44, the ECU determines on the basis of a signal output from the temperature sensor 18 whether or not the temperature T of the catalyst bed in the reforming reaction portion 22 is below a predetermined temperature T2 (T2<T1) (S46). Even if the supply of fuel has been stopped in S44, the amount of oxygen in the reformer 20 may become excessive, and the temperature T of the catalyst bed may rise as an unintended effect as indicated by an alternate long and short dash line in FIG. 21. Hence, if it is determined in S46 that the temperature T of the catalyst bed is not below the predetermined temperature T2, the ECU 50 further determines whether or not the temperature T of the catalyst bed is above a predetermined temperature T3 (T3>T1) (S48).

If it is determined in S48 that the temperature T of the catalyst bed is above the predetermined temperature T3, the ECU 50 again causes the fuel injection device 15 to inject a predetermined amount of fuel (S50). Thus, even after the supply of fuel to the reformer 20 has been stopped temporarily, the amount of oxygen in the reformer 20 is excessive if the temperature T of the catalyst bed has risen. Therefore, by resuming the supply of fuel to the reformer 20 and thus counterbalancing excessiveness of oxygen in the reformer 20, the temperature T of the catalyst bed can be inhibited from further rising. Consequently, the cooling of the reforming catalyst and thus the entire reformer 20 can be promoted.

After having resumed the supply of fuel to the reformer 20 in S50, the ECU 50 determines whether or not the temperature T of the catalyst bed is below the predetermined temperature T1 (S42). If it is determined that the temperature T of the catalyst bed is below the predetermined temperature T1, the ECU 50 stops the fuel injection device 15 and stops supplying fuel to the reformer 20 (S44). If it is determined in S48 that the temperature T of the catalyst bed is not above the predetermined temperature T3, the ECU 50 determines again in S46 whether or not the temperature T of the catalyst bed is below the predetermined temperature T2.

If it is determined in S46 that the temperature T of the catalyst bed is below the predetermined temperature T2, the ECU 50 sets the opening of the flow rate adjusting valve 14 as an opening determined in advance, and resumes the supply of air to the reformer 20 from the bypass pipe L2 (S52). Thereby, the mixture remaining in the reformer 20 can be purged. After having opened the flow rate adjusting valve 14 again, the ECU 50 further determines on the basis of a signal output from the temperature sensor 18 whether or not the temperature T of the catalyst bed in the reforming reaction portion 22 is below a predetermined temperature T5 (T5<T2) (S54).

Figure 21:
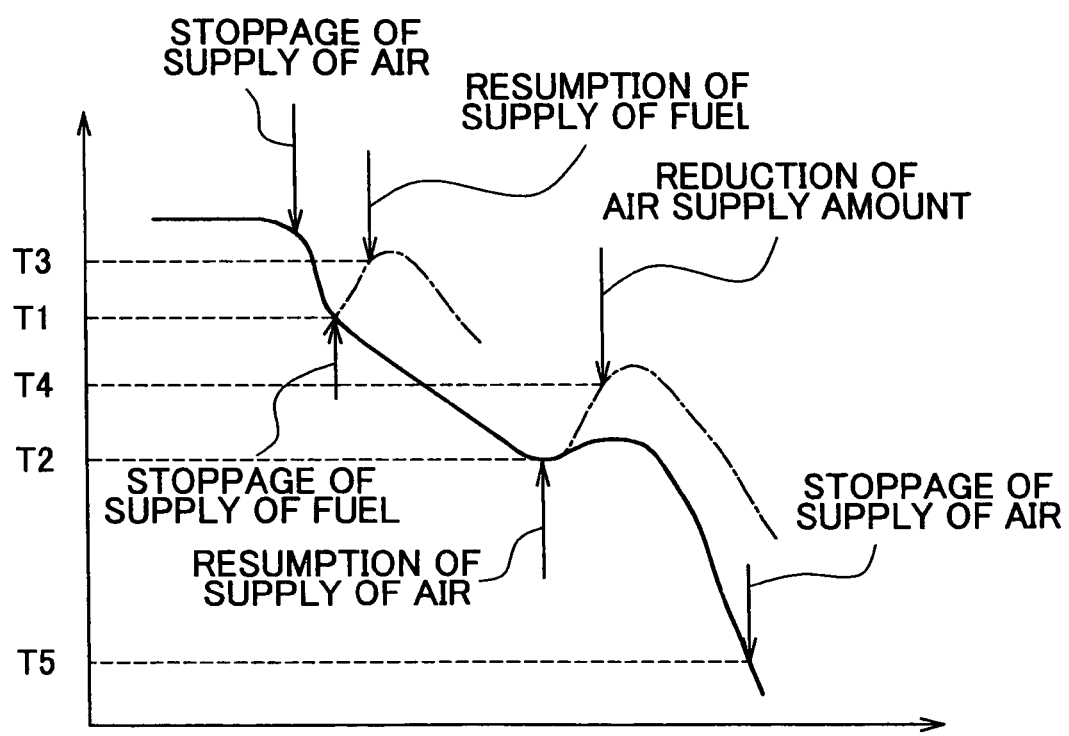
FIG. 21 is a graph showing how the temperature of the catalyst bed changes when the internal combustion engine shown in FIG. 10 operates according to the flowchart shown in FIG. 20.

Even if the supply of air has been resumed in S52, the amount of oxygen in the reformer 20 may become excessive and the temperature T of the catalyst bed may rise as an unintended effect as indicated by an alternate long and two short dashes line in FIG. 21. Hence, if it is determined in S54 that the temperature T of the catalyst bed is not below the predetermined temperature T5, the ECU 50 further determines whether or not the temperature T of the catalyst bed is above the predetermined temperature T4 (T4>T2) (S56).

If it is determined in S56 that the temperature T of the catalyst bed is above the predetermined temperature T4, the ECU 50 reduces an opening of the flow rate adjusting valve 14 and reduces an amount of air supplied to the reformer 20 by a predetermined amount (S58). Thus, if the temperature T of the catalyst bed has risen again after resumption of the supply of air to the reformer 20, a further rise in the temperature T of the catalyst bed can be suppressed by reducing an amount of air supplied to the reformer 20. Consequently, the cooling of the reforming catalyst and thus the entire reformer 20 can be promoted.

After having reduced an amount of air supplied to the reformer 20 in S58, the ECU 50 determines whether or not the temperature T of the catalyst bed is below the predetermined temperature T2 (S46). If it is determined that the temperature T of the catalyst bed is below the predetermined temperature T2, the ECU 50 sets the opening of the flow rate adjusting valve 14 as an opening determined in advance (S52). If it is determined in S56 that the temperature T of the catalyst bed is not above the predetermined temperature T4, the ECU 50 determines again in S54 whether or not the temperature T of the catalyst bed is below the predetermined temperature T5. If it is determined in S54 that the temperature T of the catalyst bed is below the predetermined temperature T5, the ECU 50 completely closes the flow rate adjusting valve 14 and stops supplying air to the reformer 20 from the bypass line 12 (S60), whereby the reformer 20 is stopped completely.

(Third Embodiment)

Hereinafter, an internal combustion engine in accordance with the third embodiment of the invention will be described with reference to FIGS. 22 and 23. Components identical with those described in relation to the aforementioned first embodiment are denoted by the same reference numerals, and repetition of the same description will be avoided.

Figure 22:
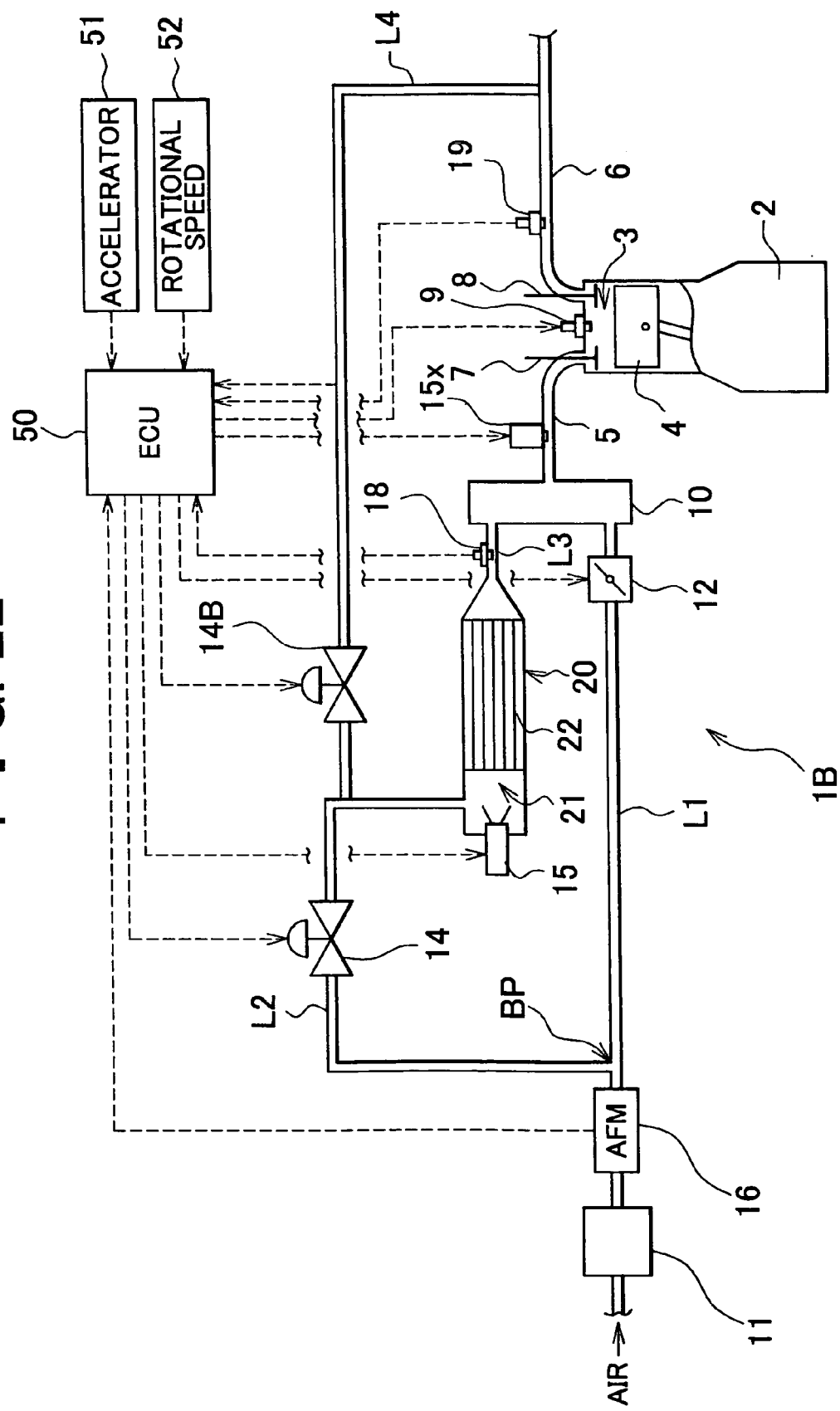
FIG. 22 is a schematic block diagram of an internal combustion engine in accordance with a third embodiment of the invention.
Figure 23:
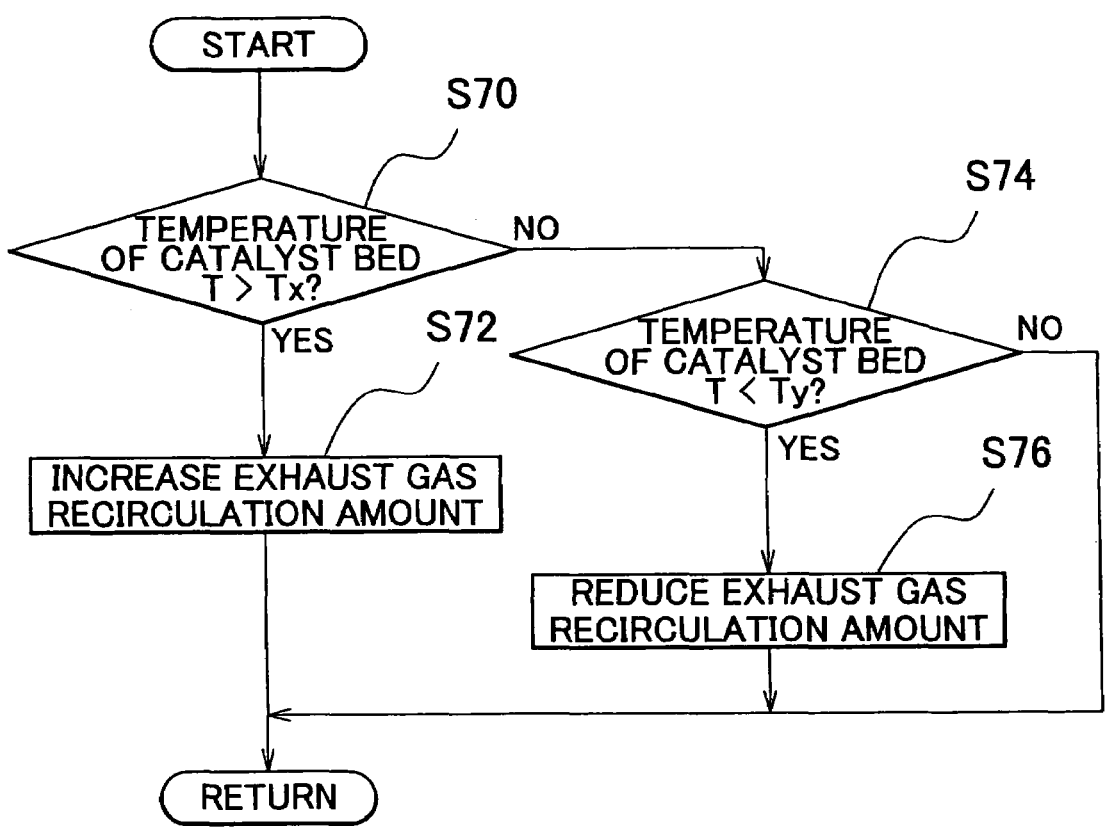
FIG. 23 is a graph for explaining operation of the internal combustion engine shown in FIG. 22.

An internal combustion engine 1B shown in FIG. 22 is basically identical in construction with the internal combustion engine 1A in accordance with the aforementioned second embodiment. The internal combustion engine 1B in accordance with the third embodiment is constructed such that exhaust gas (inactive gas) flowing from the combustion chambers 3 can be recirculated to the reformer 20. That is, an exhaust gas recirculation pipe L4 branches off from the exhaust pipe 6 connected to each of the combustion chambers 3 at a position downstream of the exhaust gas A/F sensor 19. A flow rate adjusting valve 14B extends across the exhaust gas recirculation pipe L4. The exhaust gas recirculation pipe L4 is connected at its leading end to the bypass pipe L2 between the flow rate adjusting valve 14 and the reformer 20. The ECU 50 controls the flow rate adjusting valve 14B for the exhaust gas recirculation pipe L4 as well as the flow rate adjusting valve 14 for the bypass pipe L2. The exhaust gas recirculation pipe L4, the flow rate adjusting valve 14B, and the ECU 50 function as an exhaust gas recirculation portion for causing exhaust gas flowing from the combustion chambers 3 to recirculate to the reformer 20.

In the thus-constructed internal combustion engine 1B of the third embodiment as well, as is the case with the aforementioned internal combustion engines 1 and 1A, the ECU 50 sets the air-fuel ratio (O/C) of the mixture in the reformer 20 as a constant value (O/C=1) such that the reforming efficiency of the reformer 20 is held within a desired range. However, various factors may bring about a probability that fuel and air will not mix with each other sufficiently in the reformer 20 and that a reforming reaction will not occur at the reforming efficiency within the aforementioned desired range.

In view of this, in the internal combustion engine 1B in accordance with the third embodiment, the flow rate adjusting valve 14B for the exhaust gas recirculation pipe L4 is always opened at a predetermined opening, and exhaust gas flowing from the combustion chambers 3 is recirculated to the air-fuel mixing portion 21 of the reformer 20. Thereby, in the internal combustion engine 1B, fuel and air can be mixed well with each other, and the interior of the reforming reaction portion 22 can be suitably heated up. Therefore, the reforming efficiency of the reformer 20 can be excellently held within the aforementioned desired range.

On the other hand, the temperature T of the catalyst bed in the reformer 20 may abruptly change in response to a change in load or the like. An abrupt change in temperature of the reformer 20 may bring about a probability that the reforming efficiency within the aforementioned desired range will not be achieved or that the temperature T of the catalyst bed will rise excessively. Hence, as shown in FIG. 23, the ECU 50 always monitors the temperature T of the catalyst bed in the reforming reaction portion 22 on the basis of a signal output from the temperature sensor 18.

Namely, while the reformer 20 is in operation, the ECU 50 determines on the basis of a signal output from the temperature sensor 18 whether or not the temperature T of the catalyst bed is above a predetermined temperature Tx (S70). If it is determined in S70 that the temperature T of the catalyst bed is above the predetermined temperature Tx, the ECU 50 increases an opening of the flow rate adjusting valve 14B for the exhaust gas recirculation pipe L4 by a predetermined amount, thus increasing an amount of exhaust gas recirculated from the combustion chambers 3 to the reformer 20 (S72). Thus, in the internal combustion engine 1B, even if the temperature T of the catalyst bed has abruptly risen due to an abrupt change in load or the like, a further rise in the temperature T of the catalyst bed can be suppressed by utilizing exhaust gas (inert gas) recirculated from the combustion chambers 3 to the reformer 20. As a result, the reforming catalyst and thus the entire reformer 20 can be cooled.

If it is determined in S70 that the temperature T of the catalyst bed is not above the predetermined temperature Tx, the ECU 50 determines whether or not the temperature T of the catalyst bed is below a predetermined temperature Ty (Ty<Tx) (S74). If it is determined in S74 that the temperature T of the catalyst bed is below the predetermined temperature Ty, the ECU 50 reduces an opening of the flow rate adjusting valve 14B for the exhaust gas recirculation pipe L4 by a predetermined amount, thus reducing an amount of exhaust gas recirculated from the combustion chambers 3 to the reformer 20 (S76). Thereby, recirculation of more than a required amount of exhaust gas from the combustion chambers 3 to the reformer 20 can be prevented, and the reforming efficiency of the reformer 20 can always be held within the aforementioned desired range.

If it is determined in S74 that the temperature T of the catalyst bed is not below the predetermined temperature Ty, namely, if the temperature T of the catalyst bed is equal to or higher than Ty and equal to or lower than Tx, the opening of the flow rate adjusting valve 14B for the exhaust gas recirculation pipe L4 is not changed but held at an opening corresponding to steady operation of the engine. Thus, the reforming efficiency of the reformer 20 is reliably held within the aforementioned desired range.

In the third embodiment, if the supply of the mixture to the reformer 20 is stopped to stop the internal combustion engine 1B or to operate the internal combustion engine 1B by causing the fuel injection device 15x attached to the intake pipe 5 to inject fuel during so-called cold start, the amount of exhaust gas recirculated from the combustion chambers 3 to the reformer 20 is increased.

That is, upon receiving a command to stop supplying the mixture to the reformer 20, the ECU 50 of the internal combustion engine 1B increases an opening of the flow rate adjusting valve 14B for the exhaust gas recirculation pipe L4 by a predetermined amount from an opening corresponding to steady operation of the engine. Thereby, when the supply of the mixture to the reformer 20 is stopped, the amount of oxygen in the reformer 20 can be prevented from becoming excessive, the occurrence of a reaction in the reforming reaction portion 22 can be suppressed, and the reforming catalyst (the reformer) can be cooled. Thus, the reforming catalyst can be reliably inhibited from deteriorating due to an abrupt rise in temperature.

(Fourth Embodiment)

Hereinafter, an internal combustion engine in accordance with the fourth embodiment of the invention will be described with reference to FIGS. 24 and 25. Components identical with those described in relation to the aforementioned first embodiment are denoted by the same reference numerals, and repetition of the same description will be avoided.

Figure 24:
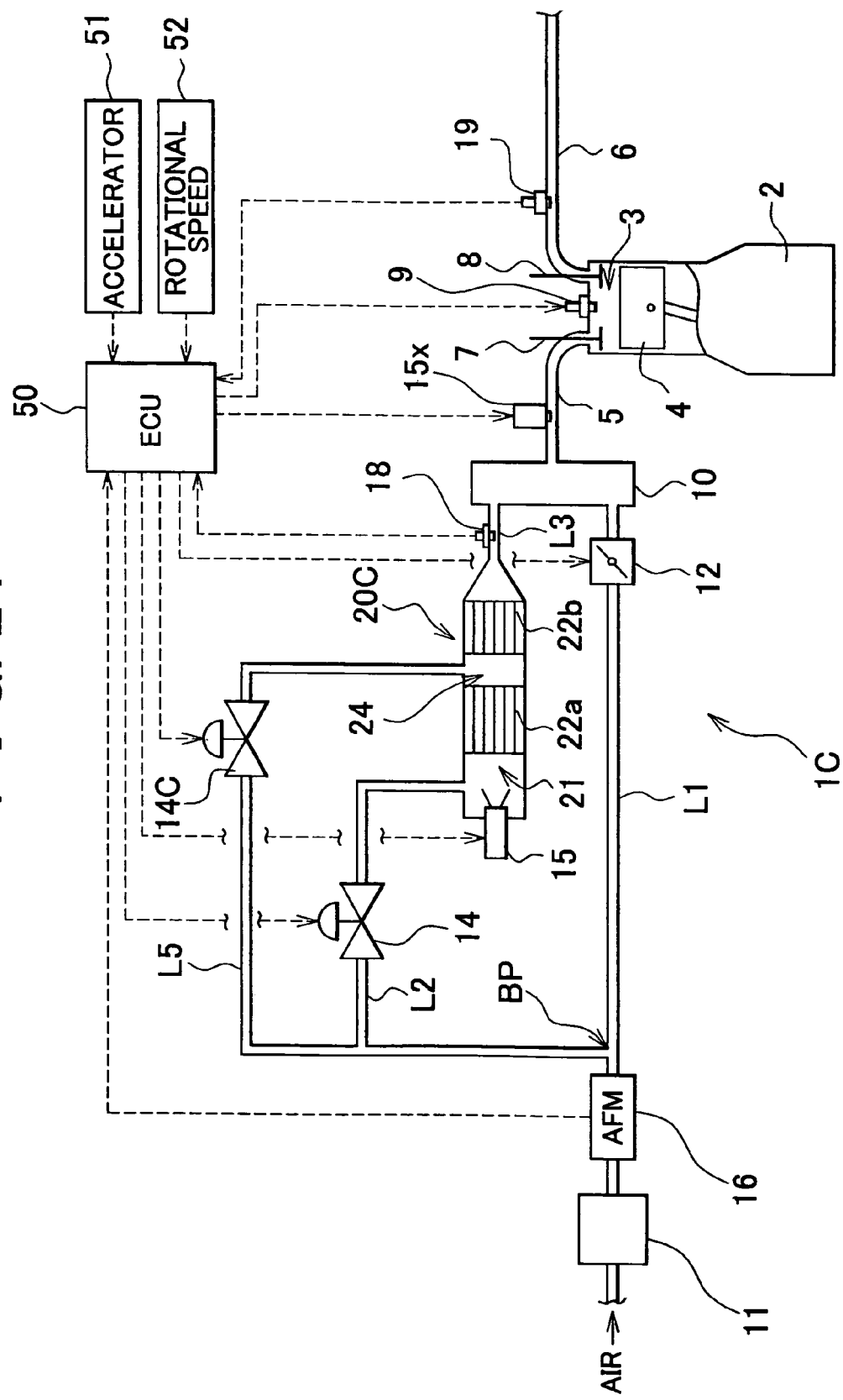
FIG. 24 is a schematic block diagram of an internal combustion engine in accordance with a fourth embodiment of the invention.

An internal combustion engine 1C shown in FIG. 24 is basically identical in construction with the internal combustion engine 1A in accordance with the aforementioned second embodiment. However, the internal combustion engine 1C in accordance with the fourth embodiment includes a reformer 20C that is different from the ones provided in the aforementioned internal combustion engines 1, 1A and 1B. As shown in FIG. 24, the reformer 20C has a plurality of reforming reaction portions 22a and 22b that are disposed along a flow direction of the mixture, and an air supply portion 24 in which no reforming catalyst is disposed is defined between the reforming reaction portions 22a and 22b.

A branch pipe L5 branches off from the bypass line L2 at a position between the bifurcated portion BP connected to the air-supply pipe L1 and the flow rate adjusting valve 14. A flow rate adjusting valve 14C extends across the branch pipe L5, which is connected at its leading end to the air supply portion 24 between the reforming reaction portions 22a and 22b. The ECU 50 controls the flow rate adjusting valve 14C for the branch pipe L5 as well as the flow rate adjusting valve 14 for the bypass pipe L2. The branch pipe L5, the flow rate adjusting valve 14C, and the ECU 50 function as means for supplying air (oxygen) to the air supply portion 24 set between the reforming reaction portions 22a and 22b.

In the internal combustion engine 1C thus constructed, an amount of air supplied to the reformer 20C (reformed air supply amount) via the bypass pipe L2 and the branch pipe L5 and an amount of fuel injected from the fuel injection device 15, namely, an amount of the mixture supplied to the reformer 20C are set such that the ratio O/C of the mixture in the entire reformer 20C becomes equal to a constant value (O/C=1) and that an actual output torque (rotational speed) coincides with a target torque (target rotational speed).

Because a reforming reaction progresses in an extremely short period, the temperature in the reformer (the temperature of the catalyst bed) tends to be high on the upstream side with respect to a flow direction of the mixture. The stronger this tendency becomes, the more the reforming catalyst on the upstream side with respect to the flow direction deteriorates. If air and fuel have not mixed with each other upstream of the reformer (reforming catalyst), the complete oxidation reaction expressed by the aforementioned formula (2) progresses in a range corresponding to an excessive amount of oxygen, so that the reforming catalyst is heated up. In a range corresponding to an excessive amount of fuel, the reforming reaction does not progress sufficiently, so that unreformed HC may be directly mixed with reformed gas.

In view of this, in the internal combustion engine 1C in accordance with the fourth embodiment, the mixture supplied to the reforming reaction portion 22a disposed upstream of the air supply portion 24 with respect to the flow direction is made rich. Namely, in the internal combustion engine 1C, the ECU 50 suitably adjusts openings of the flow rate adjusting valve 14 for the bypass pipe L2 and the flow rate adjusting valve 14C for the branch pipe L5, such that the ratio O/C of the mixture in the air-fuel mixing portion 21 of the reformer 20C becomes smaller than 1. Thereby, the reforming catalyst in the reforming reaction portion 22a upstream of the air supply portion 24 can be inhibited from being heated up excessively.

In this case, unreformed HC remain in the reforming reaction portion 22a upstream of the air supply portion 24. The unreformed HC are mostly gasified in the reforming reaction portion 22a that has been heated up, mix with oxygen in the air supply portion 24, and are suitably reformed in the reforming reaction portion 22b downstream of the air supply portion 24. Accordingly, the internal combustion engine 1C makes it possible to suppress a local deterioration of the reforming catalyst, to reliably reform fuel, and to excellently hold the reforming efficiency of the reformer 20C within a desired range.

On the other hand, as described above, if the air-fuel ratio of the mixture in the reforming reaction portion 22a upstream of the air supply portion 24 is made rich, the amount of fuel contained in the atmosphere in the reforming reaction portion 22a on the upstream side becomes excessive, so that coking of the reforming catalyst may be caused in the reforming reaction portion 22a. In view of this, in the internal combustion engine 1C, if a predetermined operational condition is fulfilled even in the case where air is supplied from the branch pipe L5 to the air supply portion 24 of the reformer 20C, the mixture is made lean in the reforming reaction portion 22a upstream of the air supply portion 24.

Figure 25:
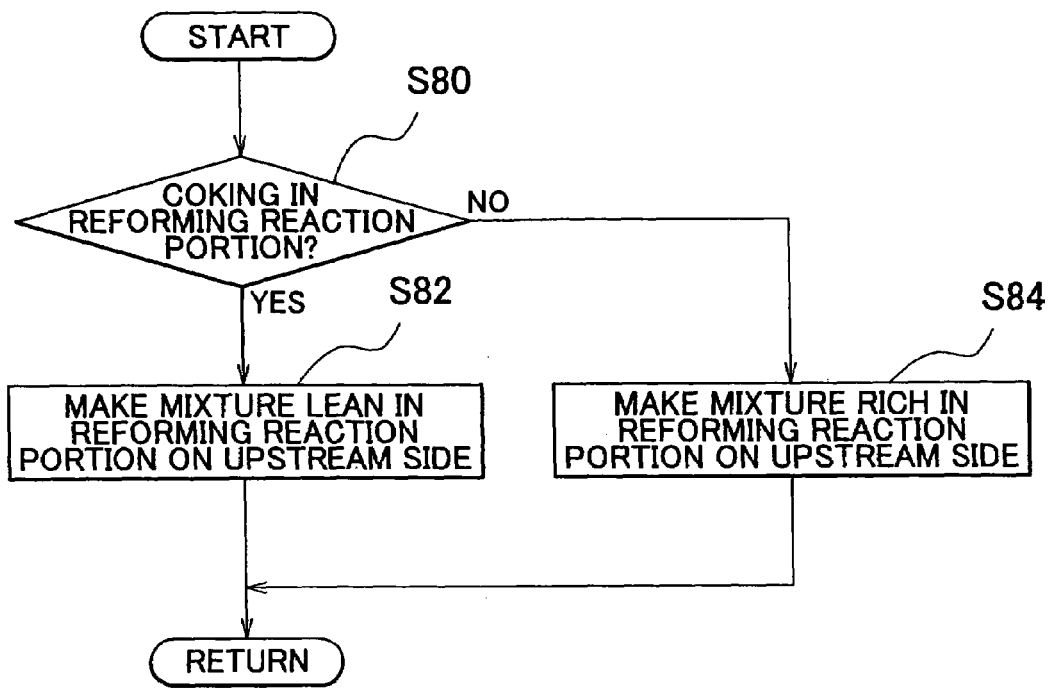
FIG. 25 is a flowchart for explaining operation of the internal combustion engine shown in FIG. 24.

That is, as shown in FIG. 25, the ECU 50 of the internal combustion engine 1C always determines whether or not coking may be caused in the reforming reaction portion 22a upstream of the air supply portion 24 (S80). In this case, the presence or absence of coking can be determined from an operating period of the reformer 20C or the like, for example, after a temperature of the catalyst bed, an amount of air supplied to the reforming reaction portion 22a, an amount of fuel supplied to the reforming reaction portion 22a, and the like have been grasped.

If it is determined in S80 that coking may be caused in the reforming reaction portion 22a, the ECU 50 suitably sets openings of the flow rate adjusting valve 14 for the bypass pipe L2 and the flow rate adjusting valve 14C for the branch pipe L5 such that the ratio O/C of the mixture in the air-fuel mixing portion 21 of the reformer 20C remains above 1 for a predetermined period (S82). Thereby, the amount of oxygen contained in the reforming reaction portion 22a is made temporarily excessive. As a result, the occurrence of coking can be suppressed, and the reforming catalyst in which coking has been caused can be recovered. If it is determined in S80 that the occurrence of coking is unlikely, the ratio O/C of the mixture in the air-fuel mixing portion 21 is set smaller than a usual value of 1 so as to make the mixture in the air-fuel mixing portion 21 of the reformer 20C rich (S84).

In the fourth embodiment, the amount of the catalyst carried in the reforming reaction portion 22a on the upstream side may be made smaller than the amount of the catalyst carried in the reforming reaction portion 22b on the downstream side. If honeycomb materials on which the reforming catalyst is carried are disposed in the reforming reaction portions 22a and 22b, the number of cells in the honeycomb material disposed in the reforming reaction portion 22a on the upstream side may be made smaller than the number of cells in the honeycomb material disposed in the reforming reaction portion 22b on the downstream side. Furthermore, the reforming reaction portion 22a may be provided with a pre-heater.

(Fifth Embodiment)

Figure 27:
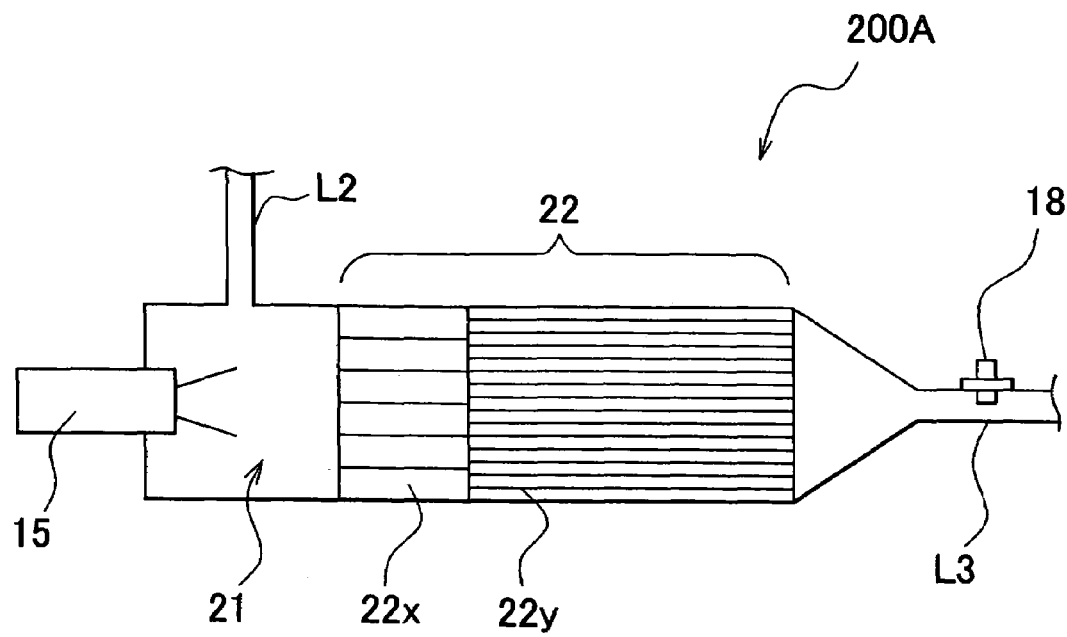
FIG. 27 is a schematic block diagram of a reformer in accordance with a modification example of the fifth embodiment of the invention.
Figure 28:
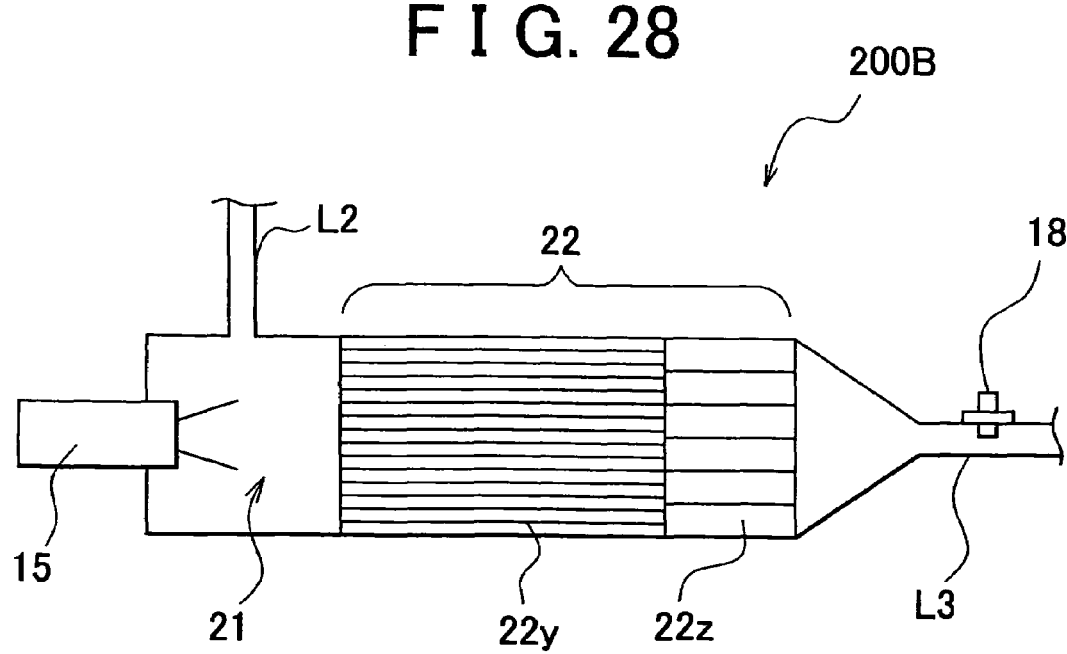
FIG. 28 is a schematic block diagram of a reformer in accordance with another modification example of the fifth embodiment of the invention.

Hereinafter, an internal combustion engine in accordance with the fifth embodiment of the invention will be described with reference to FIGS. 26 to 28. Components identical with those described in relation to the aforementioned first embodiment are denoted by the same reference numerals, and repetition of the same description will be avoided.

Figure 26:
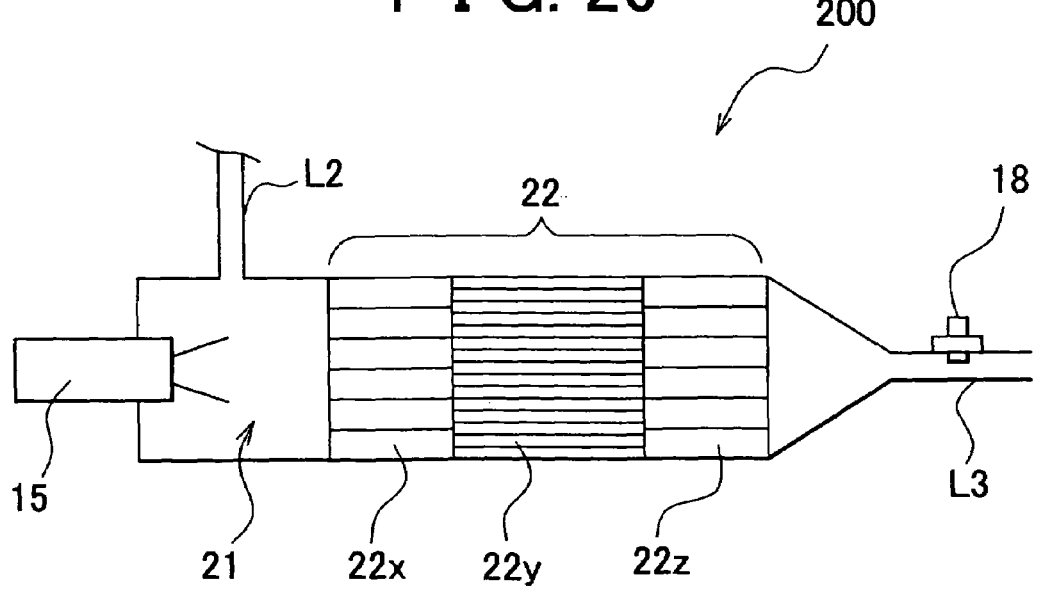
FIG. 26 is a schematic block diagram of a reformer in accordance with a fifth embodiment of the invention.

FIG. 26 is a schematic block diagram of a reformer 200 that can be applied to the internal combustion engines 1, 1A and 1B in accordance with the aforementioned first to third embodiments. In the reformer 200 shown in FIG. 26, the reforming reaction portion 22 is divided into a plurality of regions 22x, 22y and 22z in a flow direction of the mixture.

A honeycomb material on which a reforming catalyst is carried is disposed on each of the regions 22x, 22y and 22z. In the fifth embodiment, the amount of the reforming catalyst carried on the honeycomb material in the region 22x on the upstream side with respect to the flow direction of the mixture and the amount of the reforming catalyst carried on the honeycomb material in the region 22z on the downstream side with respect to the flow direction of the mixture are smaller than the amount of the reforming catalyst carried on the honeycomb material in the region 22y between the regions 22x and 22y.

Thus, in the reformer 200 in accordance with the fifth embodiment, the catalyst small-amount-carriage regions 22x and 22y are included in the reforming reaction portion 22 at its upstream and downstream ends with respect to the flow direction of the mixture respectively, while the amount of the reforming catalyst disposed in each of the catalyst small-amount-carriage regions 22x and 22y is smaller than the amount of the reforming catalyst disposed in the region 22y. Thereby, while the reformer 200 is in operation, the progress of a reforming reaction in the region 22x on the upstream side of the reforming reaction portion 22 is suppressed. Therefore, an excessive rise in temperature of the reforming catalyst, which generally tends to be caused on the upstream side of the reformer, can be suppressed.

In the reformer 200, the region 22x at the upstream end of the reforming reaction portion 22 receives heat from the region 22y on the downstream side and is suitably heated up. Thus, fuel supplied to the air-fuel mixing portion 21 of the reformer 200 can be gasified and mixed well with air in the region 22x on the upstream side. Moreover, in the reformer 200, reaction heat generated in the region 22y that is not a catalyst small-amount-carriage region is also transferred to the region 22z on the downstream side of the reforming reaction portion 22. Therefore, the heat radiation performance of the reformer 200 can be improved as a whole, and the reforming catalyst can be effectively inhibited from being heated up.

In the reformer 200 described above, both the region 22x on the upstream side of the reforming reaction portion 22 and the region 22z on the downstream side of the reforming reaction portion 22 are designed as catalyst small-amount-carriage regions. However, the invention is not limited to this construction. That is, as in the case of a reformer 200A shown in FIG. 27, it is also appropriate that only the region 22x on the upstream side of the reforming reaction portion 22 be designed as a catalyst small-amount-carriage region. As in the case of a reformer 200B shown in FIG. 28, it is also appropriate that only the region 22z on the downstream side of the reforming reaction portion 22 be designed as a catalyst small-amount-carriage region. Adoption of these constructions also makes it possible to suppress an excessive rise in temperature of the reforming catalyst which is likely to be caused on the upstream side of the reformer 200A or 200B, to improve the heat radiation performance of the reformer 200A or 200B as a whole, and to effectively inhibit the reforming catalyst from being heated up.

In the reformers 200, 200A and 200B of the fifth embodiment, the amount of the catalyst carried in the catalyst small-amount-carriage regions may be made zero through a construction wherein honeycomb materials having no catalyst carried thereon are disposed in the regions 22x and 22z of the reforming reaction portion 22. Adoption of this construction also makes it possible to suppress an excessive rise in temperature of the reforming catalyst which is likely to be caused on the upstream side of the reformer, to improve the heat radiation performance of the reformer as a whole, and to effectively inhibit the reforming catalyst from being heated up. In addition, if the above-mentioned reformers 200, 200A and 200B are provided with the air supply portion described in relation to the third embodiment, they can be applied to the above-mentioned internal combustion engine 1C.

What is claimed is:

1. An internal combustion engine comprising:
   a combustion chamber in which a predetermined fuel component is burnt;
   a reformer that has a reforming catalyst, and that produces a reformed gas which contains the fuel component obtained by reforming a mixture of fuel and air and which supplied to the combustion chamber; and
   a control portion that sets an air-fuel ratio of the mixture in the reformer such that a reforming efficiency of the reformer is held within a predetermined range, and that sets an amount of the mixture supplied to the reformer such that an actual torque of the internal combustion engine coincides with a target torque.

2. The internal combustion engine according to claim 1, wherein
   the reformer produces a reformed gas containing carbon monoxide and hydrogen by reforming a mixture of hydrocarbon fuel and air, and
   the control portion sets a ratio of a number of oxygen atoms in air to a number of carbon atoms in fuel supplied to the reformer approximately within a range of 0.4 to 1.1.

3. The internal combustion engine according to claim 1, wherein
   the reformer produces a reformed gas containing carbon monoxide and hydrogen by reforming a mixture of hydrocarbon fuel and air, and
   the control portion sets a ratio of a number of oxygen atoms in air to a number of carbon atoms in fuel supplied to the reformer approximately within a range of 0.8 to 1.05.

4. The internal combustion engine according to claim 1, wherein
   the control portion sets an amount of air supplied to the reformer such that an actual output torque of the internal combustion engine coincides with a target torque, and sets an amount of fuel supplied to the reformer on the basis of the amount of air and the air-fuel ratio.

5. The internal combustion engine according to claim 4, wherein
   the control portion substantially simultaneously sets amounts of air and fuel supplied to the reformer and an amount of air mixed with the reformed gas in accordance with the target torque.

6. The internal combustion engine according to claim 1, further comprising:
   an air-supply passage for mixing air with the reformed gas produced by the reformer; and
   an adjustment portion that is provided in the air-supply passage and that adjust an amount of air mixed with the reformed gas via the air-supply passage,
   wherein the control portion controls the adjustment portion such that an air-fuel ratio of the mixture absorbed into the combustion chamber becomes equal to a desired value.

7. The internal combustion engine according to claim 6, wherein
   the control portion substantially simultaneously sets amounts of air and fuel supplied to the reformer and an amount of air mixed with the reformed gas in accordance with the target torque.

8. The internal combustion engine according to claim 1, further comprising:
a temperature detection portion that detects a temperature of the reforming catalyst, wherein
the control portion estimates the air-fuel ratio of the mixture in the reformer on the basis of the temperature detected by the temperature detection portion.

9. The internal combustion engine according to claim 8, wherein
the control portion corrects the estimated air-fuel ratio in the reformer in accordance with an amount of fuel supplied to the reformer.

10. The internal combustion engine according to claim 8, wherein
the control portion adjusts an amount of fuel supplied to the reformer on the basis of the estimated air-fuel ratio.

11. The internal combustion engine according to claim 1, further comprising:
a temperature detection portion that detects a temperature of the reforming catalyst, wherein
the control portion adjusts an amount of fuel supplied to the reformer on the basis of the temperature detected by the temperature detection portion.

12. The internal combustion engine according to claim 1, wherein
the control portion sets the air-fuel ratio of the mixture of fuel and air in the reformer larger than the air-fuel ratio corresponding to the reforming efficiency within the predetermined range when the supply of the mixture to the reformer is started.

13. The internal combustion engine according to claim 1, wherein
an air supply amount is reduced prior to stoppage of the supply of fuel to the reformer when the supply of the mixture to the reformer is stopped.

14. The internal combustion engine according to claim 1, further comprising:
an exhaust gas recirculation portion that causes exhaust gas flowing from the combustion chamber to recirculate to the reformer.

15. The internal combustion engine according to claim 14, further comprising:
a temperature detection portion that detects a temperature of the reforming catalyst; and
a control portion that controls the exhaust gas recirculation portion on the basis of the temperature detected by the temperature detection portion.

16. The internal combustion engine according to claim 14, wherein
the exhaust gas recirculation portion increases an amount of exhaust gas recirculated to the reformer when the supply of the mixture to the reformer is stopped.

17. The internal combustion engine according to claim 1, wherein
the reformer has a plurality of reforming reaction portions disposed along a flow direction of the mixture and an oxygen supply portion that supplies oxygen to an oxygen inflow portion set between the reforming reaction portions, and
the air-fuel ratio of the mixture is set smaller than an air-fuel ratio corresponding to the reforming efficiency within the predetermined range in the reforming reaction portion that is disposed upstream of the oxygen inflow portion with respect to the flow direction.

18. The internal combustion engine according to claim 1, wherein
the reformer has a plurality of reforming reaction portions disposed along a flow direction of the mixture and an oxygen supply portion that supplies oxygen to an oxygen inflow portion set between the reforming reaction portions,
the oxygen supply portion supplies oxygen to the oxygen inflow portion of the reformer, and
the air-fuel ratio of the mixture is set larger than the air-fuel ratio corresponding to the reforming efficiency within the predetermined range in the reforming reaction portion that is disposed upstream of the oxygen inflow portion with respect to the flow direction, upon fulfillment of a predetermined operational condition on the reformer.

19. The internal combustion engine according to claim 1, wherein
the reformer has a reforming reaction portion in which the reforming catalyst is disposed,
the reforming reaction portion includes a catalyst small-amount-carriage region at least either at an upstream end thereof or at a downstream end thereof with respect to the flow direction of the mixture, an amount of the reforming catalyst in the catalyst small-amount-carriage region being smaller than an amount of the reforming catalyst in any other region.

20. A method of operating an internal combustion engine comprising a combustion chamber in which a predetermined fuel component is burnt and a reformer that has a reforming catalyst, that reforms a mixture of fuel and air, that contains the fuel component, and that produces a reformed gas supplied to the combustion chamber, comprising the steps of:
setting an air-fuel ratio of the mixture in the reformer such that a reforming efficiency of the reformer is held within a predetermined range; and
setting an amount of the mixture supplied to the reformer such that an actual torque of the internal combustion engine coincides with a target torque.

\* \* \* \* \*